US012717676B2

(12) United States Patent
Mittal et al.

(10) Patent No.: US 12,717,676 B2
(45) Date of Patent: Aug. 25, 2026

(54) LOSSLESS, AREA-EFFICIENT ERROR DETECTION SCHEME FOR FLASH MEMORY

(71) Applicant: Sandisk Technologies, Inc., Milpitas, CA (US)

(72) Inventors: Sajal Mittal, Bangalore (IN); Siddhesh Darne, Milpitas, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/350,350

(22) Filed: Jul. 11, 2023

(65) Prior Publication Data

US 2024/0184667 A1 Jun. 6, 2024

Related U.S. Application Data

(60) Provisional application No. 63/429,753, filed on Dec. 2, 2022.

(51) Int. Cl.
*G06F 11/10* (2006.01)

(52) U.S. Cl.
CPC ................................ *G06F 11/1008* (2013.01)

(58) Field of Classification Search
CPC .................................................. G06F 11/1008
See application file for complete search history.

(56) References Cited

U.S. PATENT DOCUMENTS 8,832,391 B2 9/2014 Choi
9,798,693 B2 10/2017 Hollis
10,635,528 B2 4/2020 Shinbashi
11,025,274 B2 6/2021 Ware
11,223,373 B2 1/2022 Cha
2002/0172106 A1* 11/2002 Kim ........................ G11B 19/04
2015/0139355 A1* 5/2015 Hollis ................ H03K 19/0175 375/296
2017/0220416 A1* 8/2017 Yao ..................... G06F 11/1068
2019/0280813 A1* 9/2019 Kozhikkottu ......... H04L 1/0041
2019/0310910 A1* 10/2019 Kwak ............... H03M 13/1575
2020/0192746 A1* 6/2020 Kwak ................. G06F 11/1048
2022/0068331 A1 3/2022 Lee
2023/0214136 A1* 7/2023 Takano ................ G11C 7/1006 711/154

* cited by examiner

*Primary Examiner* — Mark D Featherstone
*Assistant Examiner* — Jeffrey Andrew Yang
(74) *Attorney, Agent, or Firm* — Pearl Cohen LLP

(57) ABSTRACT

A circuit for detecting an error in a byte of data transmitted over a channel includes a controller having a first DBI encoder configured to perform a first DBI encoding on a received byte of data. The circuit also includes a channel configured to receive the encoded byte from the controller. The circuit also includes a non-volatile memory having a second DBI encoder and configured to (1) perform a second DBI encoding on the encoded byte received over the channel, (2) check a DBI flag for the byte after the second DBI encoding, and (3) determine that the byte of data contains an error when the DBI flag after the second DBI encoding is 1. If the byte contains an error then it can be concluded that the channel contains a defect. In case of an error a write operation to memory core can be stopped.

20 Claims, 19 Drawing Sheets

| B7 | B6 | B5 | B4 | B3 | B2 | B1 | B0 | DBI | E7 | E6 | E5 | E4 | E3 | E2 | E1 | E0 | DBI |
|---|---|---|---|---|---|---|---|---|---|---|---|---|---|---|---|---|---|
| 0 | 1 | 1 | 1 | 1 | 1 | 0 | 1 | 1 | 1 | 0 | 0 | 0 | 0 | 0 | 1 | 0 | 0 |
| 0 | 0 | 0 | 1 | 0 | 1 | 0 | 0 | 0 | 0 | 0 | 0 | 1 | 0 | 1 | 0 | 0 | 0 |
| 0 | 1 | 1 | 1 | 1 | 0 | 1 | 0 | 1 | 1 | 0 | 0 | 0 | 0 | 1 | 0 | 1 | 0 |
| 1 | 0 | 1 | 0 | 1 | 0 | 1 | 0 | 0 | 1 | 0 | 1 | 0 | 1 | 0 | 1 | 0 | 0 |
| 0 | 1 | 0 | 0 | 0 | 1 | 0 | 1 | 0 | 0 | 1 | 0 | 0 | 0 | 1 | 0 | 1 | 0 |
| 1 | 1 | 1 | 0 | 1 | 1 | 0 | 1 | 1 | 0 | 0 | 0 | 1 | 0 | 0 | 1 | 0 | 0 |
| 0 | 1 | 0 | 1 | 1 | 0 | 1 | 1 | 1 | 1 | 0 | 1 | 0 | 0 | 1 | 0 | 0 | 0 |
| 0 | 1 | 0 | 0 | 0 | 1 | 1 | 1 | 0 | 0 | 1 | 0 | 0 | 0 | 1 | 1 | 1 | 0 |
| 0 | 1 | 1 | 0 | 0 | 1 | 1 | 1 | 1 | 1 | 0 | 0 | 1 | 1 | 0 | 0 | 0 | 0 |
| 1 | 0 | 1 | 1 | 0 | 1 | 1 | 0 | 1 | 0 | 1 | 0 | 0 | 1 | 0 | 0 | 1 | 0 |
| 0 | 1 | 0 | 0 | 0 | 0 | 1 | 1 | 0 | 0 | 1 | 0 | 0 | 0 | 0 | 1 | 1 | 0 |
| 1 | 1 | 0 | 1 | 1 | 0 | 1 | 1 | 1 | 0 | 0 | 1 | 0 | 0 | 1 | 0 | 0 | 0 |
| 1 | 0 | 0 | 0 | 1 | 0 | 0 | 1 | 0 | 0 | 0 | 0 | 0 | 1 | 0 | 0 | 1 | 0 |
| 1 | 1 | 1 | 1 | 0 | 1 | 0 | 0 | 1 | 0 | 0 | 0 | 0 | 1 | 0 | 1 | 1 | 0 |
| 1 | 1 | 1 | 1 | 0 | 1 | 1 | 1 | 1 | 0 | 0 | 0 | 0 | 1 | 0 | 0 | 0 | 0 |
| 0 | 1 | 1 | 1 | 0 | 1 | 0 | 0 | 0 | 0 | 1 | 1 | 1 | 0 | 1 | 0 | 0 | 0 |
| 0 | 1 | 1 | 1 | 0 | 1 | 0 | 1 | 1 | 1 | 0 | 0 | 0 | 1 | 0 | 1 | 0 | 0 |
| 0 | 1 | 1 | 0 | 0 | 1 | 1 | 1 | 1 | 1 | 0 | 0 | 1 | 1 | 0 | 0 | 0 | 0 |
| 0 | 1 | 1 | 1 | 1 | 0 | 1 | 0 | 1 | 1 | 0 | 0 | 0 | 0 | 1 | 0 | 1 | 0 |
| 0 | 0 | 1 | 0 | 0 | 1 | 1 | 1 | 0 | 0 | 0 | 1 | 0 | 0 | 1 | 1 | 1 | 0 |
| 1 | 1 | 1 | 0 | 1 | 1 | 0 | 0 | 1 | 0 | 0 | 0 | 1 | 0 | 0 | 1 | 1 | 0 |
| 0 | 1 | 1 | 1 | 1 | 0 | 1 | 0 | 1 | 1 | 0 | 0 | 0 | 0 | 1 | 0 | 1 | 0 |
| 1 | 1 | 1 | 1 | 1 | 0 | 0 | 1 | 1 | 0 | 0 | 0 | 0 | 0 | 1 | 1 | 0 | 0 |
| 0 | 1 | 1 | 0 | 0 | 1 | 1 | 0 | 0 | 0 | 1 | 1 | 0 | 0 | 1 | 1 | 0 | 0 |
| 1 | 1 | 0 | 1 | 1 | 1 | 1 | 1 | 1 | 0 | 0 | 1 | 0 | 0 | 0 | 0 | 0 | 0 |
| 1 | 1 | 0 | 0 | 1 | 1 | 1 | 1 | 1 | 0 | 0 | 1 | 1 | 0 | 0 | 0 | 0 | 0 |
| 1 | 0 | 0 | 1 | 1 | 1 | 1 | 0 | 1 | 0 | 1 | 1 | 0 | 0 | 0 | 0 | 1 | 0 |
| 1 | 1 | 0 | 0 | 0 | 0 | 1 | 0 | 0 | 1 | 1 | 0 | 0 | 0 | 0 | 1 | 0 | 0 |
| 0 | 1 | 1 | 0 | 0 | 0 | 0 | 0 | 0 | 0 | 1 | 1 | 0 | 0 | 0 | 0 | 0 | 0 |
| 1 | 0 | 0 | 0 | 1 | 0 | 0 | 1 | 0 | 1 | 0 | 0 | 0 | 1 | 0 | 0 | 1 | 0 |

| N7 | N6 | N5 | N4 | N3 | N2 | N1 | N0 |
|---|---|---|---|---|---|---|---|
| 0.329885 | 1.831278 | 2.512618 | -0.68063 | 0.745748 | -0.48002 | -1.05999 | -0.14635 |
| -0.0208 | -0.34175 | 0.052368 | -0.37679 | 0.557788 | -1.19701 | -0.2782 | -0.07926 |
| 1.306909 | -0.09359 | -1.44022 | 0.514163 | 1.625908 | 0.23827 | 0.441476 | 0.34484 |
| 0.438563 | -0.84165 | -1.39797 | 0.245817 | 0.180278 | 2.175685 | 0.9246 | 1.922996 |
| -0.30462 | -0.17211 | 0.574177 | -0.77967 | 0.233653 | -1.56621 | 2.2708 | -0.88911 |
| 1.69856 | 1.742161 | -0.98552 | -0.9327 | 0.079812 | 1.41053 | 0.663193 | 0.428888 |
| -2.30148 | -1.18248 | 0.371577 | -0.29796 | 0.138201 | 1.653275 | 1.313414 | -1.58555 |
| 0.657725 | 1.093539 | -0.01949 | 0.105061 | 1.37339 | 0.401777 | 2.291224 | -0.03899 |
| 1.955202 | 0.035531 | 0.154699 | 0.401855 | -0.389 | 0.881487 | 0.434546 | 0.524818 |
| -0.61001 | -1.19617 | -0.91413 | 0.969829 | 0.17166 | -0.23051 | 0.710905 | -1.06705 |
| -0.6583 | -1.87064 | -0.62044 | -0.70125 | 0.460502 | -1.09186 | 2.207338 | -0.07804 |
| 0.696128 | -0.32341 | 0.367245 | 1.106443 | -1.58798 | 0.548306 | 0.844504 | -0.27512 |
| 2.602038 | -0.75882 | -0.07444 | 0.906319 | -0.12314 | 0.539325 | 1.242073 | -0.20341 |
| 0.362034 | -1.61361 | 0.248106 | -0.06976 | -0.42127 | -2.10298 | 1.097016 | -0.13395 |
| 0.544529 | 0.246982 | 0.428931 | 0.276885 | -0.95608 | 0.450852 | 0.621235 | -0.50504 |
| 0.862849 | 1.651883 | 0.483666 | 0.611798 | 1.008262 | -0.54179 | 1.676306 | -0.71897 |
| -0.45148 | 0.015566 | -0.07339 | -0.77173 | -0.43393 | 0.502287 | 0.658858 | -0.95958 |
| 1.690293 | -0.85838 | 0.163518 | -0.6911 | 0.75962 | -0.32769 | 1.34323 | 0.681833 |
| 0.275768 | 0.877235 | -0.68956 | 0.895456 | 1.572969 | -0.92805 | -0.75794 | 0.45119 |
| 0.949913 | -0.60631 | 0.054781 | 0.480324 | -2.39765 | -0.59178 | -0.03441 | -0.97212 |
| 2.17657 | 0.636247 | 0.427676 | -1.73812 | -0.59469 | -0.73665 | -1.58736 | 0.981921 |
| 0.247084 | -0.73631 | 0.643418 | 0.390997 | 0.31528 | 2.311505 | -0.86465 | 0.785866 |
| 0.759266 | 0.420765 | -0.48756 | 0.564338 | 0.826768 | 0.706743 | -0.43605 | -0.99224 |
| 0.472805 | -2.60347 | -0.61002 | -0.9517 | -2.43736 | -0.74569 | -1.55708 | 0.148957 |
| -0.63649 | 1.099765 | -0.74466 | -0.29822 | 0.39755 | 0.386072 | -0.9173 | 0.286496 |
| -1.20237 | 1.527149 | -1.85389 | 0.475329 | 0.903198 | -0.14845 | 1.075401 | 1.417903 |
| -0.78607 | 0.262953 | 0.496207 | 0.000439 | 1.002622 | -1.32937 | -0.03761 | 1.392437 |
| -0.72824 | 0.52209 | -1.49029 | -0.91415 | -0.07421 | -0.29494 | 0.837795 | 0.169886 |
| 1.375282 | 1.240149 | 0.89037 | 2.008211 | -0.05809 | 0.82101 | 0.254335 | -0.50572 |
| 1.070828 | -0.22413 | 0.405362 | 0.232378 | -0.04474 | 1.283191 | 1.098794 | 0.176404 |

A B

Normal distribution noise over the channel

| | R7 | R6 | R5 | R4 | R3 | R2 | R1 | R0 | | DBI | |
|---|---|---|---|---|---|---|---|---|---|---|---|
| | 1 | 1 | 1 | 0 | 1 | 0 | 0 | 0 | | 0 | NO ERROR |
| | 0 | 0 | 0 | 1 | 1 | 0 | 0 | 0 | | 0 | NO ERROR |
| | 1 | 0 | 0 | 1 | 1 | 1 | 0 | 1 | | 1 | ERROR |
| | 1 | 0 | 0 | 0 | 1 | 1 | 1 | 1 | | 1 | ERROR |
| | 0 | 1 | 1 | 0 | 0 | 0 | 1 | 0 | | 0 | NO ERROR |
| | 1 | 1 | 0 | 0 | 0 | 1 | 1 | 0 | | 0 | NO ERROR |
| | 0 | 0 | 1 | 0 | 0 | 1 | 1 | 0 | | 0 | NO ERROR |
| | 1 | 1 | 0 | 0 | 1 | 1 | 1 | 1 | | 1 | ERROR |
| | 1 | 0 | 0 | 1 | 1 | 1 | 0 | 1 | | 1 | ERROR |
| | 0 | 0 | 0 | 1 | 1 | 0 | 1 | 0 | | 0 | NO ERROR |
| | 0 | 0 | 0 | 0 | 0 | 0 | 1 | 1 | | 0 | NO ERROR |
| | 1 | 0 | 1 | 1 | 0 | 1 | 1 | 0 | | 1 | ERROR |
| | 1 | 0 | 0 | 1 | 1 | 1 | 1 | 1 | | 1 | ERROR |
| | 0 | 0 | 0 | 0 | 1 | 0 | 1 | 1 | | 0 | NO ERROR |
| | 1 | 0 | 0 | 0 | 0 | 0 | 1 | 0 | | 0 | NO ERROR |
| | 1 | 1 | 1 | 1 | 1 | 0 | 1 | 0 | | 1 | ERROR |
| | 1 | 0 | 0 | 0 | 1 | 1 | 1 | 0 | | 0 | NO ERROR |
| | 1 | 0 | 0 | 0 | 1 | 0 | 1 | 1 | | 0 | NO ERROR |
| | 1 | 1 | 0 | 1 | 1 | 0 | 0 | 1 | | 1 | ERROR |
| | 1 | 0 | 1 | 0 | 0 | 0 | 1 | 0 | | 0 | NO ERROR |
| | 1 | 1 | 0 | 0 | 0 | 0 | 0 | 1 | | 0 | NO ERROR |
| | 1 | 0 | 1 | 0 | 0 | 1 | 0 | 1 | | 0 | NO ERROR |
| | 1 | 0 | 0 | 1 | 1 | 1 | 1 | 0 | | 1 | ERROR |
| | 0 | 0 | 0 | 0 | 0 | 0 | 0 | 0 | | 0 | NO ERROR |
| | 0 | 1 | 0 | 0 | 0 | 0 | 0 | 0 | | 0 | NO ERROR |
| | 0 | 1 | 0 | 1 | 1 | 0 | 1 | 1 | | 1 | ERROR |
| | 0 | 1 | 1 | 0 | 1 | 0 | 0 | 1 | | 0 | NO ERROR |
| | 0 | 1 | 0 | 0 | 0 | 0 | 1 | 0 | | 0 | NO ERROR |
| | 1 | 1 | 1 | 1 | 0 | 1 | 0 | 0 | | 1 | ERROR |
| | 1 | 0 | 0 | 0 | 1 | 1 | 1 | 1 | | 1 | ERROR |

Received data bytes by NAND

DBI bit after encoding received data bytes.
DBI=1 represents ERROR DETECTED
# of DBI bits are combined to generate FLAG and improve probability of detection FIG. 11 (Continued…)

LOSSLESS, AREA-EFFICIENT ERROR DETECTION SCHEME FOR FLASH MEMORY

CROSS REFERENCE TO RELATED APPLICATIONS

This application claims the benefit of and priority to U.S. Provisional Patent Application No. 63/429,753, filed on Dec. 2, 2022, the contents of which are incorporated herein by reference in their entirety.

BACKGROUND

Flash memory is an electronic, non-volatile computer memory storage medium that can be electrically erased and reprogrammed. Flash memory is widely used across a range of products and industries including computers, mobile phones, tablet devices, personal digital assistants (PDAs), digital audio players, digital cameras, video games, scientific instrumentation, industrial robotics, and medical electronics, to name a few. NAND flash memory—one of the two primary types of flash memory—can be found in memory cards, USB flash drives, solid-state drives, smartphones, and the like. NAND flash memory may employ floating gate transistors, such as floating gate metal-oxide-semiconductor field-effect transistors (MOSFETs), connected in a manner that resembles a NAND logic gate to store a charge which represents a data state.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
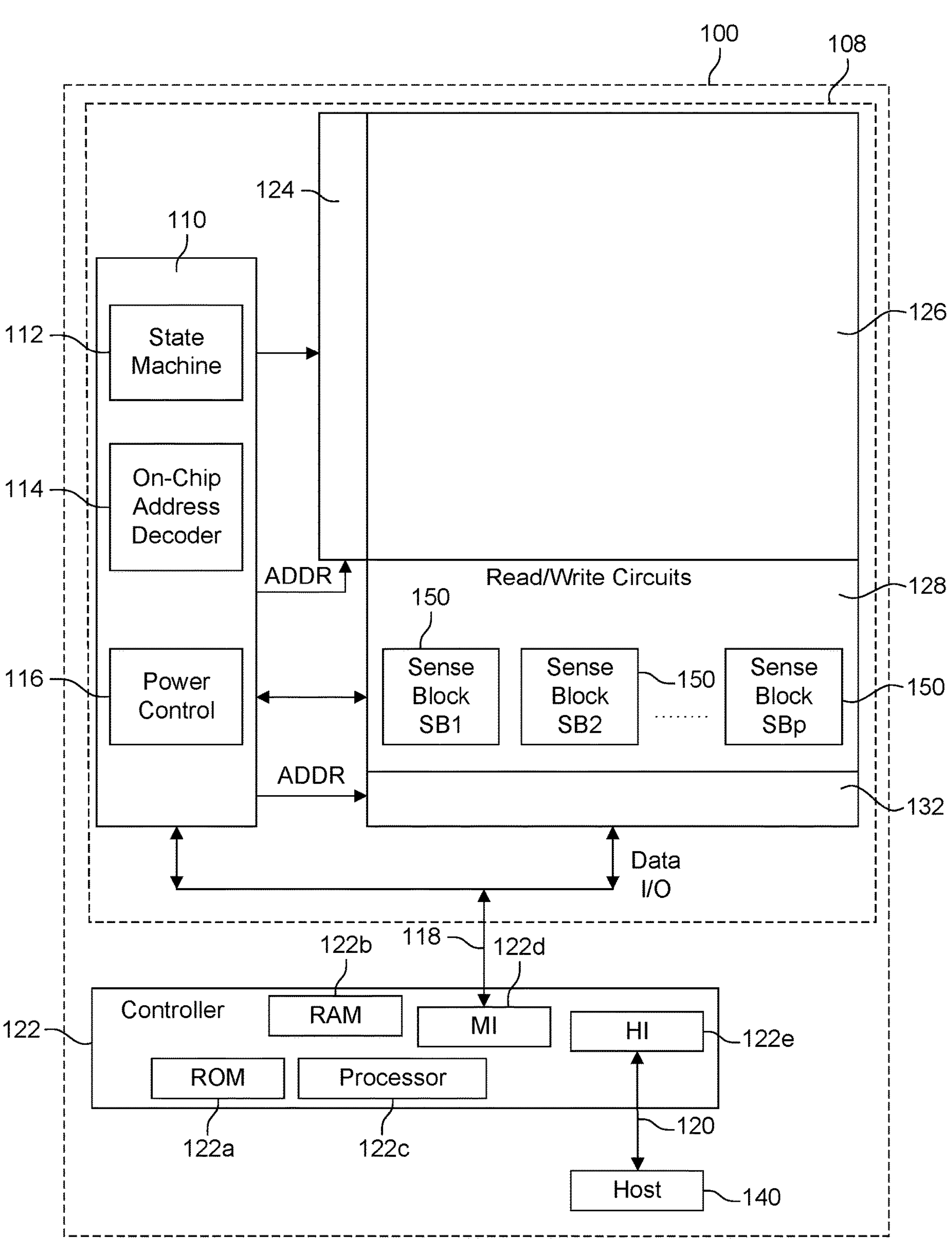
FIG. 1 is a block diagram of an example memory device, in connection with which, example embodiments of the disclosed technology can be implemented.

The figures are not exhaustive and do not limit the present disclosure to the precise form disclosed.

DETAILED DESCRIPTION

Example embodiments of the present disclosure provide an area-efficient error detection scheme for a flash memory that can be lossless or near lossless.

One technical problem with flash memories is that errors can arise during transfer of data. For example, in transmitting data over a channel, such as from a controller to a NAND memory, data integrity can be compromised if the data has been modified, corrupted, or altered during transfer. Thus, before writing data into memory, it is beneficial to verify that no errors in the data have been detected. Accordingly, a write error detection scheme (ECC) is typically used for determining whether the received data may have errors, which informs as to whether there is a defect in the channel. Various conventional ECC techniques are currently in use. Many of the previous approaches work on a similar concept, as in the following example.

First, a controller uses an algorithm to add redundant bits to each data byte, and the controller transmits the entire codeword along with the redundant bits across a channel to a NAND memory. The NAND memory receives the entire codeword including the redundant bits. The NAND memory then uses the same algorithm to generate the redundant bits inside the NAND memory. The NAND memory compares the redundant bits generated inside the NAND memory with the redundant bits received through the channel. If the two sets of redundant bits are different then the NAND memory determines that there is an error.

One well known data integrity check is a cyclic redundancy check (CRC). The CRC is an error-detecting code commonly used in digital networks and storage devices for detecting errors or accidental changes to digital data. Blocks of data entering these systems get a short check value attached, based on the remainder of a polynomial division of their contents. On retrieval, the calculation is repeated and, in the event the check values do not match, corrective action can be taken against data corruption. This division is typically performed using a shift register or a plurality of XOR gates.

Known ECC schemes including the CRC suffer from drawbacks posing technical problems. For example, known ECC schemes can require an extremely large area for their implementation. Known ECC schemes can also lead to significant bandwidth loss due to adding the redundant ECC bits. The CRC in particular is impractical or not well suited for NAND memory because of extremely large implementation overhead and bandwidth loss that can be around 25% in some cases. This means that in some cases, for each and every byte, two bits (25% of overhead) are added.

Example embodiments of the disclosed technology provide a system, method, computer program product, circuit, and computing component for detecting an error or errors in transmitted data, which can therefore inform that there is a defect in a channel.

In example embodiments, Data Bit Inversion (DBI) encoding schemes are utilized. In a DBI encoding scheme, a controller considers an incoming byte of eight bits of data and counts the total number of 0s and 1s among the eight bits in the byte. If the byte has five or more 1s then each bit in the byte is changed to its opposite state; that is, each 1 in the byte is inverted to a 0 and each 0 in the byte is inverted to a 1. If, on the other hand, the byte has four or fewer 1s then no bits in the byte are inverted. Accordingly, DBI encoding can ensure that the number of 1s in a byte is four or fewer. In DBI encoding if the byte has five or more 1s and therefore the DBI encoding inverts its bits then a DBI flag is set to 1; and if the byte has four or fewer 1s and therefore the DBI encoding does not invert its bits then the DBI flag is set to 0.

In an example embodiment of the disclosed technology a circuit for detecting an error in a byte of data transmitted over a channel includes a controller having a first DBI encoder configured to perform a first DBI encoding on a received byte of data. The circuit also includes a channel configured to receive the encoded byte from the controller. The circuit also includes a non-volatile memory having a second DBI encoder and configured to (1) perform a second DBI encoding on the encoded byte received over the channel, (2) check a DBI flag for the byte after the second DBI encoding, and (3) determine that the byte of data contains an error when the DBI flag after the second DBI encoding is 1. If the byte contains an error then it can be concluded that the channel contains a defect. In embodiments the controller is further configured to stop a write operation of the byte into the non-volatile memory when the DBI flag after the second DBI encoding is 1, i.e., if the channel contains a defect.

By providing from the non-volatile memory a flag in case of a data error, the controller can take a corrective step before writing into a memory core (such as the memory core of a non-volatile memory system), or can stop the writing operation into the memory core. By virtue of the features of the disclosed technology, a hardcoded error inside the non-volatile memory that may lead to system failure can be avoided.

In some embodiments the non-volatile memory further comprises an OR gate configured to: (1) combine N bytes of data that have been twice encoded, (2) check the DBI flags on each N byte, and (3) determine that the channel contains an error when the DBI flag on any of the N bytes is 1. In embodiments the controller is further configured to stop a write operation of the N bytes into the non-volatile memory when the DBI flag on any of the N bytes is 1.

In some embodiments the non-volatile memory is a NAND memory, but the disclosed technology is not limited thereto. Moreover, while in some embodiments a controller performs certain functions, in other embodiments at least some of those same or similar functions may be performed for example by a non-volatile memory.

Another example embodiment of the disclosed technology provides a method of detecting an error in data transmitted over a channel. The method includes performing, by a non-volatile memory, a second DBI encoding on a byte of data received over the channel on which a first DBI encoding has already been performed. The method also includes checking a DBI flag for the byte of data after the second DBI encoding, and determining that the byte of data contains an error when the DBI flag after the second DBI encoding is 1.

Another example embodiment of the disclosed technology provides a circuit for detecting an error in a byte of data transmitted over a channel, comprising a non-volatile memory having a DBI encoder and configured to perform a second DBI encoding on a byte of data received over the channel on which a first DBI encoding has already been performed, check a DBI flag for the byte after the second DBI encoding, and determine that the byte of data contains an error when the DBI flag after the second DBI encoding is 1.

Another example embodiment of the disclosed technology provides a method of detecting an error in data transmitted over a channel. The method includes performing, by a non-volatile memory, a second DBI encoding on a byte of data received over the channel on which a first DBI encoding has already been performed. The method also includes combining N bytes of data that have been twice encoded, checking a DBI flag on each of the N bytes, and determining that the channel contains an error when the DBI flag on any of the N bytes is 1.

FIG. 1 is a block diagram of an example non-volatile memory system 100. In one embodiment, the non-volatile memory system 100 is a card-based system, such as a secure digital (SD) or a micro secure digital (micro-SD) card. In an alternate embodiment, memory system 100 is part of an embedded memory system. For example, the flash memory may be embedded within the host. In other examples, memory system 100 can be a solid state drive (SSD). The non-volatile memory system 100 includes one or more non-volatile memory dies 108, and a controller 122. The memory die 108 can be a complete memory die or a partial memory die. As seen here, the memory die 108 includes a memory structure 126, control circuitry 110, and read/write/erase circuits 128. The memory structure 126 is addressable by wordlines via a row decoder 124 and by bitlines via a column decoder 132. The read/write/erase circuits 128 include multiple sense blocks 150 including SB1, SB2, . . . , SBp (hereinafter referred to as sensing circuitry). The read/write/erase circuits 128 and sensing circuitry allow a page of memory cells to be read, programmed, or erased in parallel.

In one embodiment, memory structure 126 comprises a three-dimensional (3D) memory array of non-volatile memory cells in which multiple memory levels are formed above a single substrate, such as a wafer. The memory structure may comprise any type of non-volatile memory monolithically formed in one or more physical levels of arrays of memory cells having an active area disposed above a silicon (or other type of) substrate. In one example, the non-volatile memory cells comprise vertical NAND strings with charge-trapping material. In another embodiment, memory structure 126 comprises a two-dimensional (2D) memory array of non-volatile memory cells. In one example, the non-volatile memory cells are NAND flash memory cells utilizing floating gates.

The exact type of memory array architecture or memory cell included in memory structure 126 is not limited to the examples above. Many different types of memory array architectures or memory technologies can be used to form memory structure 126. No particular non-volatile memory technology is required for purposes of the new claimed embodiments proposed herein. Other examples of suitable technologies for memory cells of the memory structure 126 include 2D arrays, 3D arrays, and other memory structures that may have a string configuration. Although current iterations of other memory structure (e.g., MRAM, PCM, and Spin RAM) are configured without a string, memories of these cells can be configured into a topology that has a string, and thus could be utilized in a format that would allow them to be erased in a block format and programmed in chunks. Thus, in this potential configuration, embodiments of the disclosure could be foreseeably applied.

A person of ordinary skill in the art will recognize that the technology described herein is not limited to a single specific memory structure, but covers many relevant memory structures within the spirit and scope of the technology as described herein and as understood by one of ordinary skill in the art.

The control circuitry 110 cooperates with the read/write/erase circuits 128 to perform memory operations (e.g., write, read, erase) on memory structure 126, and includes state machine 112, an on-chip address decoder 114, and a power control circuit 116. In one embodiment, control circuitry 110 includes buffers such as registers, read-only memory (ROM) fuses and other storage devices for storing default values such as base voltages and other parameters. The on-chip address decoder 114 provides an address interface between addresses used by host 140 or controller 122 and the hardware address used by the decoders 124 and 132. Power control circuit 116 controls the power and voltages supplied to the wordlines, bitlines, and select lines during memory operations. The power control circuit 116 includes voltage circuitry, in one embodiment. Power control circuit 116 may include charge pumps for creating voltages. The sense blocks 150 include bitline drivers. The power control circuit 116 executes under control of the state machine 112, in one embodiment.

State machine 112 and/or controller 122 (or equivalently functioned circuits), in combination with all or a subset of the other circuits depicted in FIG. 1, can be considered a control circuit that performs the functions described herein. Such a control circuit can include hardware only or a combination of hardware and software (including firmware). For example, a controller programmed by firmware to perform the functions described herein is one example of a control circuit. A control circuit can include a processor, a PGA (Programmable Gate Array), an FPGA (Field Programmable Gate Array), an ASIC (Application Specific Integrated Circuit), or another type of integrated circuit or circuit more generally.

The controller 122 interfaces with the one or more memory dies 108. In one embodiment, controller 122 and multiple memory dies (together comprising non-volatile storage system 100) implement an SSD, which can emulate, replace, or be used in place of a hard disk drive inside a host, as a network access storage (NAS) device, in a laptop, in a tablet, in a server, etc. Additionally, the SSD need not be made to work as a hard drive.

Some embodiments of the non-volatile storage system 100 may include one memory die 108 connected to one controller 122. Other embodiments may include multiple memory dies 108 in communication with one or more controllers 122. In one example, the multiple memory dies 108 can be grouped into a set of memory packages. Each memory package may include one or more memory dies 108 in communication with controller 122. In one embodiment, a memory package includes a printed circuit board (or similar structure) with one or more memory dies 108 mounted thereon. In some embodiments, a memory package can include molding material to encase the memory dies 108 of the memory package. In some embodiments, controller 122 is physically separate from any of the memory packages.

In one embodiment, a controller 122 is included in the same package (e.g., a removable storage card) as the memory die 108. In other embodiments, the controller is separated from the memory die 108. In some embodiments the controller is on a different die than the memory die 108. In some embodiments, one controller 122 communicates with multiple memory dies 108. In other embodiments, each memory die 108 has its own controller. Commands and data are transferred between a host 140 and controller 122 via a data bus 120, and between controller 122 and the memory die 108 via lines 118. In one embodiment, memory die 108 includes a set of input and/or output (I/O) pins that connect to lines 118.

The controller 122 includes one or more processors 122*c*, ROM 122*a*, random access memory (RAM) 122*b*, a memory interface (MI) 122*d*, and a host interface (HI) 122*e*, all of which may be interconnected. The storage devices (ROM 122*a*, RAM 122*b*) store code (software) such as a set of instructions (including firmware), and one or more of the processors 122*c* are operable to execute the set of instructions to provide functionality described herein. Alternatively or additionally, one or more processors 122*c* can access code from a storage device in the memory structure, such as a reserved area of memory cells connected to one or more wordlines. RAM 122*b* can be used to store data for controller 122, including caching program data (discussed below). MI 122*d*—in communication with ROM 122*a*, RAM 122*b*, and processor(s) 122*c*—may be an electrical circuit that provides an electrical interface between controller 122 and memory die 108. For example, MI 122*d* can change the format or timing of signals, provide a buffer, isolate from surges, latch I/O, etc. One or more processors 122*c* can issue commands to control circuitry 110 (or another component of memory die 108) via MI 122*d*. Host interface 122*e* provides an electrical interface with host 140 via data bus 120 in order to receive commands, addresses and/or data from host 140 to provide data and/or status to host 140.

Figure 2:
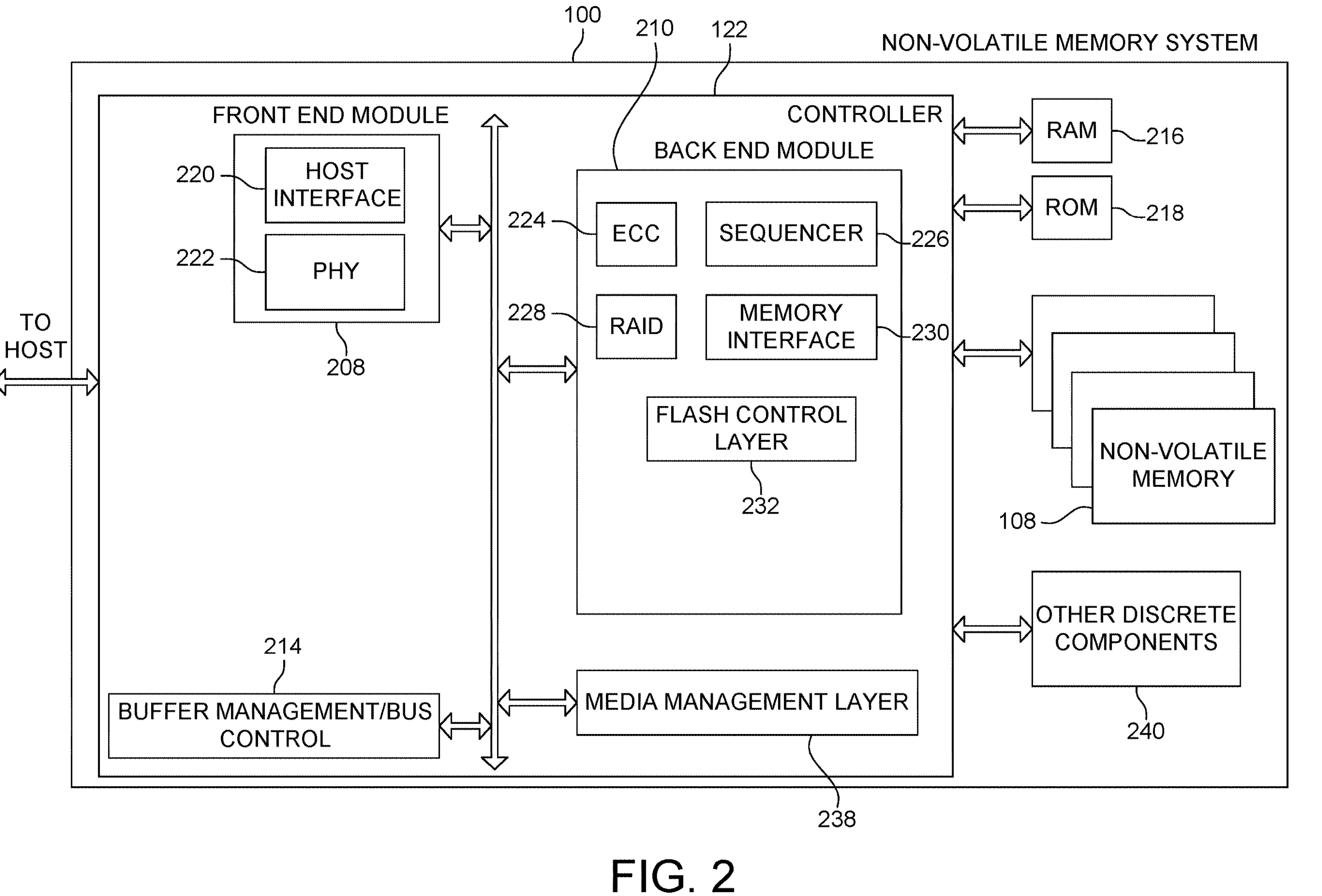
FIG. 2 is a block diagram of an example memory system, in connection with which, example embodiments of the disclosed technology can be implemented.

FIG. 2 is a block diagram of example memory system 100 that depicts more details of one embodiment of controller 122. While the controller 122 in the embodiment of FIG. 2 is a flash memory controller, it should be appreciated that the one or more non-volatile memory dies 108 are not limited to flash memory. Thus, the controller 122 is not limited to the particular example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In an example operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host itself can provide the physical address. The flash memory controller can also perform various memory management functions including, but not limited to, wear leveling (distributing writes to avoid wearing out specific blocks of memory that would otherwise be repeatedly written to) and garbage collection (after a block is full, moving only the valid pages of data to a new block, so that the block can be erased and reused).

In some embodiments, non-volatile memory system 100 includes a single channel between controller 122 and non-volatile memory die 108. However, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if only a single channel is shown in the drawings.

As depicted in FIG. 2, controller 122 includes a front-end module 208 that interfaces with a host, a back-end module 210 that interfaces with the memory die 108, and various other modules that perform functions which will now be described in detail. The components of controller 122 depicted in FIG. 2 may take various forms including, without limitation, a packaged functional hardware unit (e.g., an electrical circuit) designed for use with other components, a portion of a program code (e.g., software or firmware) executable by a (micro) processor or processing circuitry that usually performs a particular function of related functions, a self-contained hardware or software component that interfaces with a larger system, or the like. For example, each module may include an ASIC, an FPGA, a circuit, a digital logic circuit, an analog circuit, a combination of discrete circuits, gates, or any other type of hardware or combination thereof. Alternatively or additionally, each module may include software stored in a processor readable device (e.g., memory) to program a processor to enable controller 122 to perform the functions described herein. The architecture depicted in FIG. 2 is one example implementation that may (or may not) use the components of controller 122 depicted in FIG. 1 (e.g., RAM, ROM, processor, interface).

Referring again to modules of the controller 122, a buffer manager/bus control 214 manages buffers in RAM 216 and controls the internal bus arbitration of controller 122. ROM 218 stores system boot code. Although illustrated in FIG. 2 as located separately from the controller 122, in other embodiments, one or both of RAM 216 and ROM 218 may be located within the controller. In yet other embodiments, portions of RAM 216 and ROM 218 may be located within the controller 122, while other portions may be located outside the controller. Further, in some implementations, the controller 122, RAM 216, and ROM 218 may be located on separate semiconductor dies.

Front-end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fiber Channel, USB, PCIe, and NVMe. The host interface 220 typically facilitates transfer for data, control signals, and timing signals.

Back-end module 210 includes an error correction code (ECC) engine 224 that encodes the data bytes received from the host, and decodes and error corrects the data bytes read from the non-volatile memory 108. A command sequencer 226 generates command sequences, such as program and erase command sequences, to be transmitted to non-volatile memory 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as one or more extra dies, or may be added within the existing die, e.g., as an extra plane, an extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or greater interface. A flash control layer 232 controls the overall operation of back-end module 210.

Additional components of system 100 illustrated in FIG. 2 include media management layer (MML) 238, which performs wear leveling of memory cells of non-volatile memory die 108, as well as, other discrete components 240, such as external electrical interfaces, external RAM, resistors, capacitors, or other components that may interface with controller 122. In alternative embodiments, one or more of the physical layer interface 222, RAID module 228, MML 238, or buffer management/bus controller 214 are optional components.

MML 238 (e.g., Flash Translation Layer (FTL)) may be integrated as part of the flash management for handling flash errors and interfacing with the host. In particular, MML 238 may be a module in flash management and may be responsible for the internals of NAND management. In particular, MML 238 may include an algorithm in the memory device firmware which translates writes from the host into writes to the memory 126 of die 108. MML 238 may be needed because: 1) the memory 126 may have limited endurance; 2) the memory 126 may only be written in multiples of pages; and/or 3) the memory 126 may not be written unless it is erased as a block (or a tier within a block in some embodiments). MML 238 understands these potential limitations of the memory 126 which may not be visible to the host. Accordingly, MML 238 attempts to translate the writes from host into writes into the memory 126.

Figure 3:
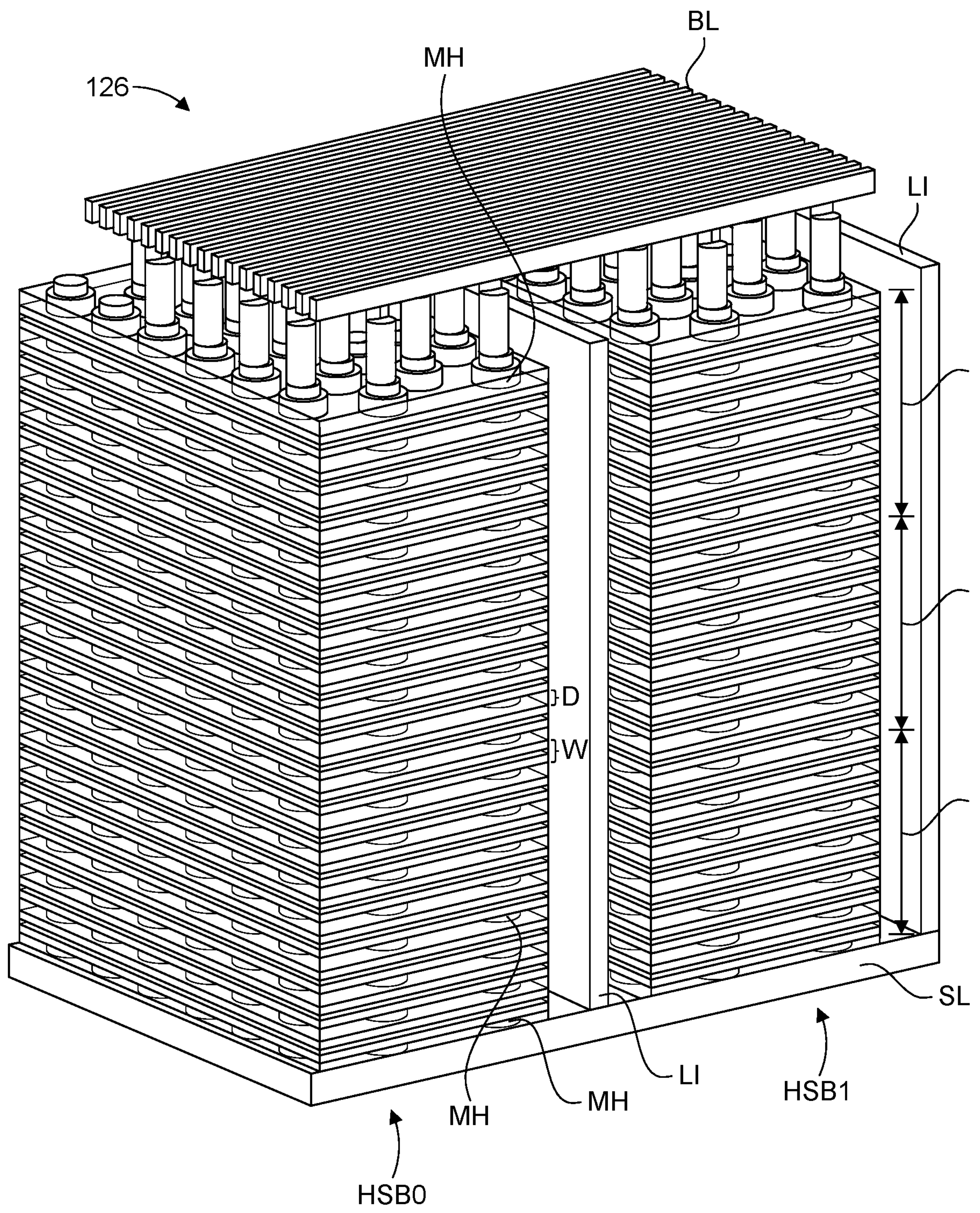
FIG. 3 is a perspective view of a portion of an example monolithic three-dimensional memory structure, in connection with which, example embodiments of the disclosed technology can be implemented.

FIG. 3 is a perspective view of a portion of a monolithic 3D memory array that includes a plurality of non-volatile memory cells, and that can comprise memory structure 126 in one embodiment. FIG. 3 illustrates, for example, a portion of one block of memory. The structure depicted includes a set of bitlines (BLs) positioned above a stack of alternating dielectric layers and conductive layers. For example purposes, one of the dielectric layers is marked as D and one of the conductive layers (i.e., wordline layers) is marked as WL. The number of alternating dielectric and conductive layers can vary based on specific implementation requirements. In some embodiments, the 3D memory array includes between 108-300 alternating dielectric and conductive layers. One example embodiment includes 96 data wordline layers, 8 select layers, 6 dummy wordline layers, and 110 dielectric layers. More or less than 108-300 layers can also be used. Data wordline layers include data memory cells. Dummy wordline layers include dummy memory cells. As will be explained below, the alternating dielectric and conductive layers are divided into four "fingers" by local interconnects LI. FIG. 3 shows two fingers and two local interconnects LI. Below the alternating D layers and WL layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 126 is provided below with respect to FIG. 4A-4G.

One of the local interconnects LI separates the block into two horizontal sub-blocks HSB0, HSB1. The block comprises multiple vertical sub-blocks VSB0, VSB1, VSB2. The vertical sub-blocks VSB0, VSB1, VSB2 can also be referred to as "tiers." Each vertical sub-block extends across the block, in one embodiment. Each horizontal sub-block HSB0, HSB1 in the block is a part of vertical sub-block VSB0. Likewise, each horizontal sub-block HSB0, HSB1 in the block is a part of vertical sub-block VSB1. Likewise, each horizontal sub-block HSB0, HSB1 in the block is a part of vertical sub-block VSB2. For purpose of discussion, vertical sub-block VSB0 will be referred to as a lower vertical sub-block, vertical sub-block VSB1 will be referred to as a middle vertical sub-block, and VSB2 will be referred to as an upper vertical sub-block. In one embodiment, there are two vertical sub-blocks in a block. There could be four or more vertical sub-blocks in a block.

A memory operation for a vertical sub-block may be performed on memory cells in one or more horizontal sub-blocks. For example, a programming operation of memory cells in vertical sub-block VSB0 may include: programming memory cells in horizontal sub-block HSB0 but not horizontal sub-block HSB1; programming memory cells in horizontal sub-block HSB1 but not horizontal sub-block HSB0; or programming memory cells in both horizontal sub-block HSB0 and horizontal sub-block HSB1.

The different vertical sub-blocks VSB0, VSB1, VSB2 are treated as separate units for erase/program purposes, in one embodiment. For example, the memory cells in one vertical sub-block can be erased while leaving valid data in the other vertical sub-blocks. Then, memory cells in the erased vertical sub-block can be programmed while valid data remains in the other vertical sub-blocks. In some cases, memory cells in the middle vertical sub-block VSB1 are programmed while there is valid data in the lower vertical sub-block VSB0 and/or the upper vertical sub-block VSB2. Programming the memory cells in middle vertical sub-block VSB1 presents challenges due to the valid data in the other vertical sub-blocks VSB0, VSB2.

Figure 4A:
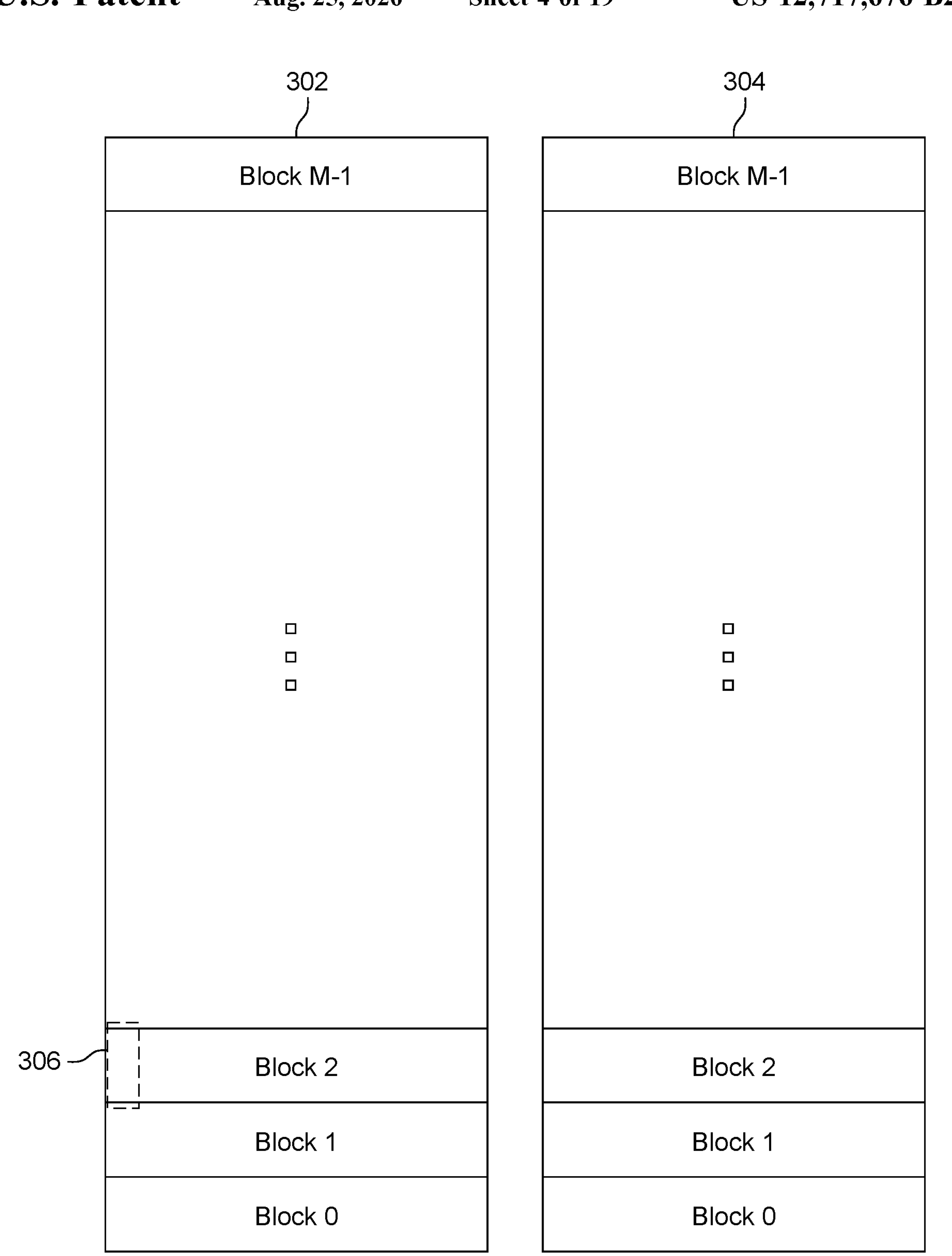
FIG. 4A is a block diagram of an example memory structure having two planes, in connection with which, example embodiments of the disclosed technology can be implemented.

FIG. 4A is a block diagram explaining one example organization of memory structure 126, which is divided into two planes 302 and 304. Each plane is then divided into M blocks. In one example, each plane has about 2000 blocks. However, different numbers of blocks and planes can also be used. In on embodiment, a block of memory cells is a unit of erase. That is, all memory cells of a block are erased together. In other embodiments, memory cells can be grouped into blocks for other reasons, such as to organize the memory structure 126 to enable the signaling and selection circuits. In some embodiments, a block represents a groups of connected memory cells as the memory cells of a block share a common set of wordlines.

Figure 4B:
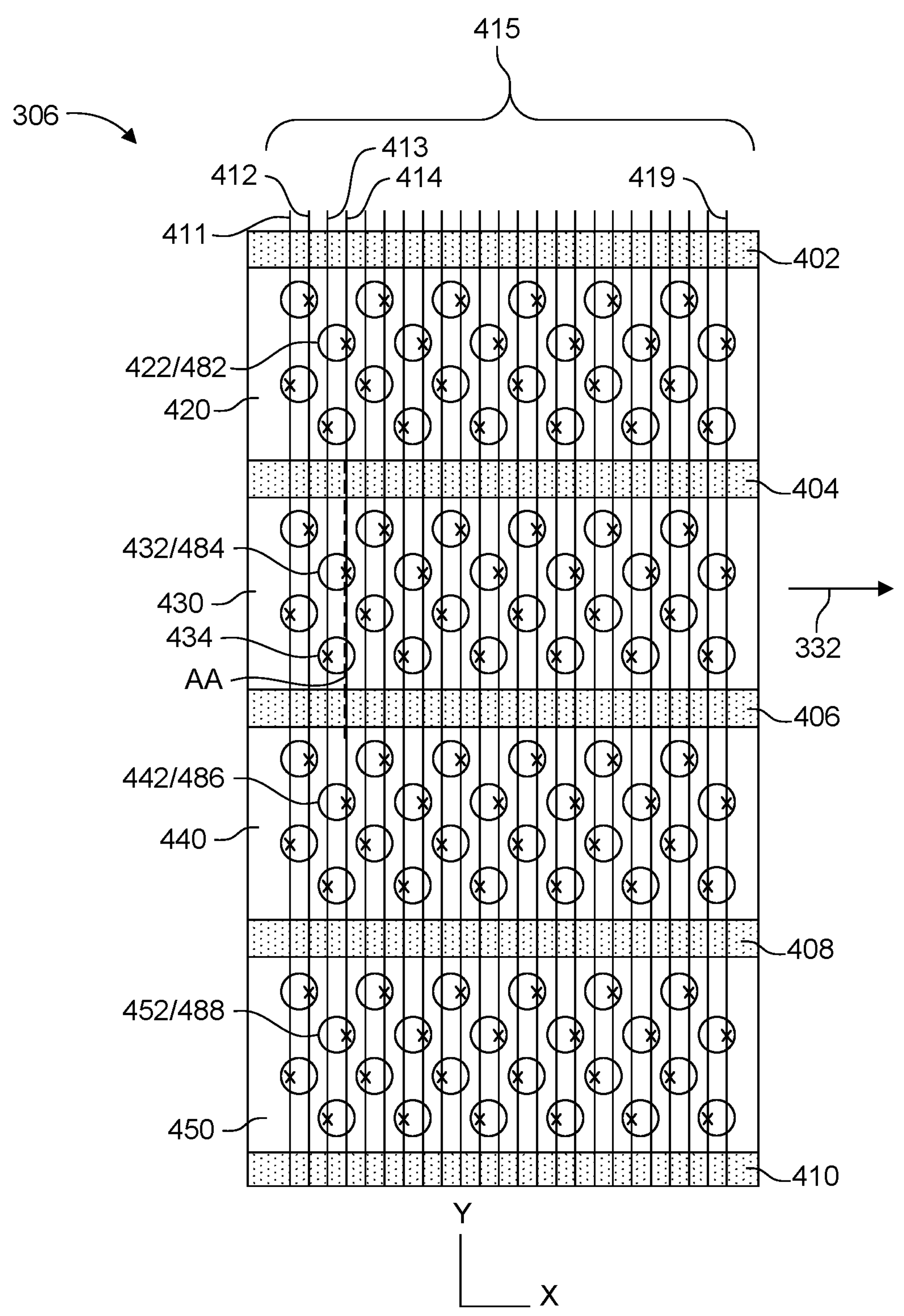
FIG. 4B depicts a top view of a portion of a block of example memory cells, in connection with which, example embodiments of the disclosed technology can be implemented.

FIGS. 4B-4F depict an example three dimensional ("3D") NAND structure that corresponds to the structure of FIG. 3 and can be used to implement memory structure 126 of FIG. 2. FIG. 4B is a block diagram depicting a top view of a portion of one block from memory structure 126. The portion of the block depicted in FIG. 4B corresponds to portion 306 in block 2 of FIG. 4A. As can be seen from FIG. 4B, the block depicted in FIG. 4B extends in the direction of 332. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 332, the block includes more vertical columns than depicted in FIG. 4B.

FIG. 4B also depicts a set of bitlines 415, including bitlines 411, 412, 413, 414, . . . 419. FIG. 4B shows twenty-four bitlines because only a portion of the block is depicted. It is contemplated that more than twenty-four bitlines connected to vertical columns of the block. Each of the circles representing vertical columns has an "x" to indicate its connection to one bitline. For example, bitline 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as wordline fingers that are separated by the local interconnects. In one embodiment, the wordline fingers on a common level of a block connect together to form a single wordline. In another embodiment, the wordline fingers on the same level are not connected together. In one example implementation, a bitline only connects to one vertical column in each of regions 420, 430, 440 and 450. In that implementation, each block has sixteen rows of active columns and each bitline connects to four rows in each block. In one embodiment, all of four rows connected to a common bitline are connected to the same wordline (via different wordline fingers on the same level that are connected together); therefore, the system uses the source side selection lines and the drain side selection lines to choose one (or another subset) of the four to be subjected to a memory operation (program, verify, read, and/or erase).

Although FIG. 4B shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block. FIG. 4B also shows the vertical columns being staggered. In other embodiments, different patterns of staggering can be used. In some embodiments, the vertical columns are not staggered.

Figure 4C:
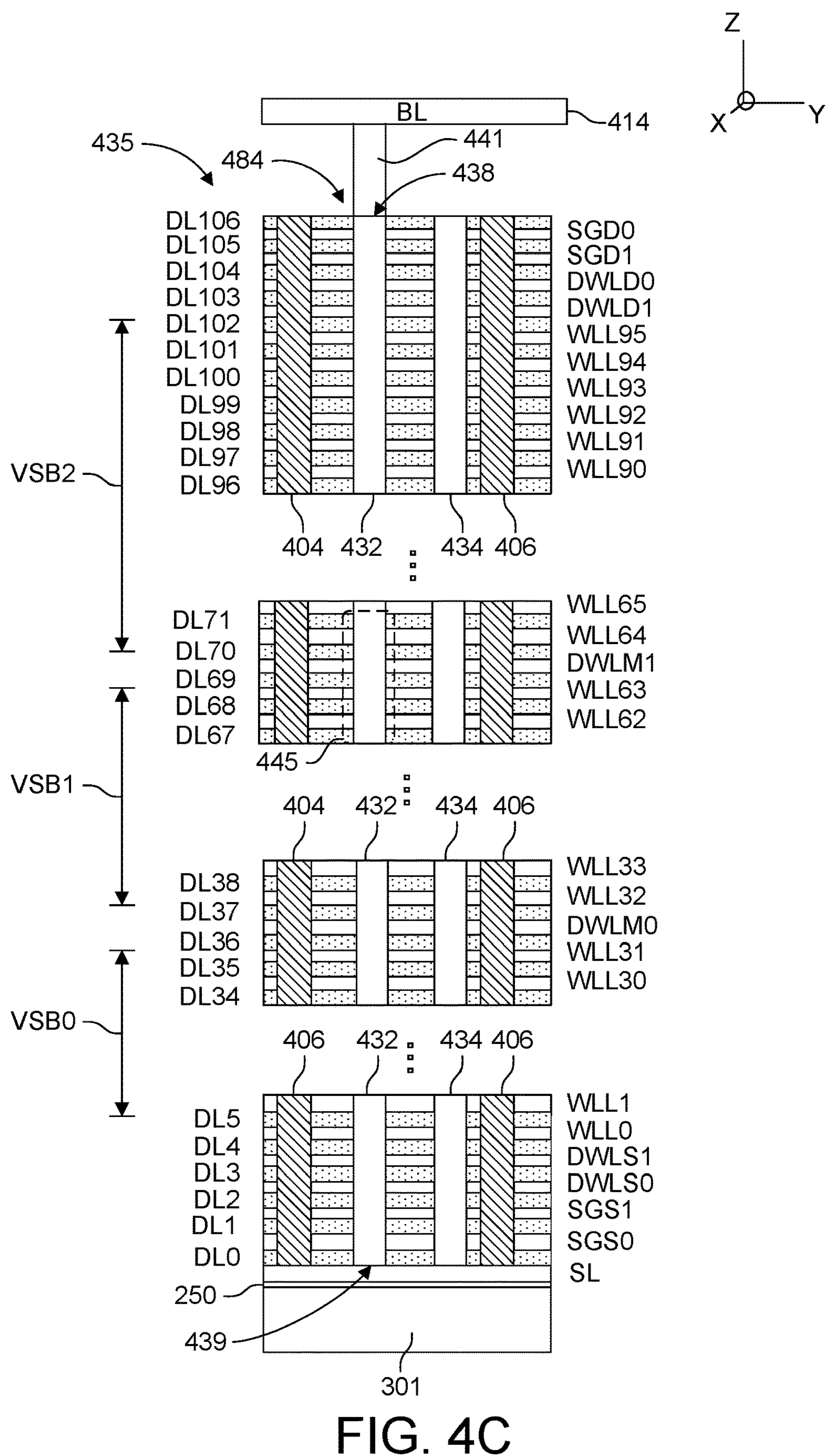
FIG. 4C depicts a stack showing a cross-sectional view along line AA of FIG. 4B.

FIG. 4C depicts an embodiment of a stack 435 showing a cross-sectional view along line AA of FIG. 4B. Two SGD layers (SGD0, SDG1), two SGS layers (SGS0, SGS1) and six dummy wordline layers DWLD0, DWLD1, DWLM1, DWLM0, DWLS0 and DWLS1 are provided, in addition to the data wordline layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 301, an insulating film 250 on the substrate, and a portion of a source line SL. A portion of the bitline 414 is also depicted. Note that NAND string 484 is connected to the bitline 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bitline 414. The metal-filled slits 404 and 406 from FIG. 4B are also depicted.

The stack 435 is divided into three vertical sub-blocks (VSB0, VSB1, VSB2). Vertical sub-block VSB0 includes WLL0-WLL31. The following layers could also be considered to be a part of vertical sub-block VSB0 (SGS0, SGS1, DWLS0, DWLS1). Vertical sub-block VSB1 includes WLL32-WLL63. Vertical sub-block VSB2 includes WLL64-WLL95. The following layers could also be considered to be a part of vertical sub-block VSB2 (SGD0, SGD1, DWLD0, DWLD1). Each NAND string has a set of data memory cells in each of the vertical sub-blocks. Dummy wordline layer DMLM0 is between vertical sub-block VSB0 and vertical sub-block VSB1. Dummy wordline layer DMLM1 is between vertical sub-block VSB1 and vertical sub-block VSB2. The dummy wordline layers have dummy memory cell transistors that may be used to electrically isolate a first set of memory cell transistors within the memory string (e.g., corresponding with vertical sub-block VSB0 wordlines WLL0-WLL31) from a second set of memory cell transistors within the memory string (e.g., corresponding with the vertical sub-block VSB1 wordlines WLL32-WLL63) during a memory operation (e.g., an erase operation or a programming operation).

In another embodiment, one or more middle junction transistor layers are used to divide the stack 435 into vertical sub-blocks. A middle junction transistor layer contains junction transistors, which do not necessarily contain a charge storage region. Hence, a junction transistor is typically not considered to be a dummy memory cell. Both a junction transistor and a dummy memory cell may be referred to herein as a "non-data transistor." A non-data transistor, as the term is used herein, is a transistor on a NAND string, wherein the transistor is either configured to not store user or system data or operated in such a way that the transistor is not used to store user data or system data. A wordline that is connected to non-data transistors is referred to herein as a non-data wordline. Examples of non-data wordlines include, but are not limited to, dummy wordlines, and a select line in a middle junction transistor layer.

The stack 435 may have more than three vertical sub-blocks. For example, the stack 435 may be divided into four, five or more vertical sub-blocks. Each of the vertical sub-block contains at least one data memory cell. There may additional layers similar to the middle dummy wordline layers DWLM in order to divide the stack 435 into the additional vertical sub-blocks. In one embodiment, the stack has two vertical sub-blocks.

Figure 4D:
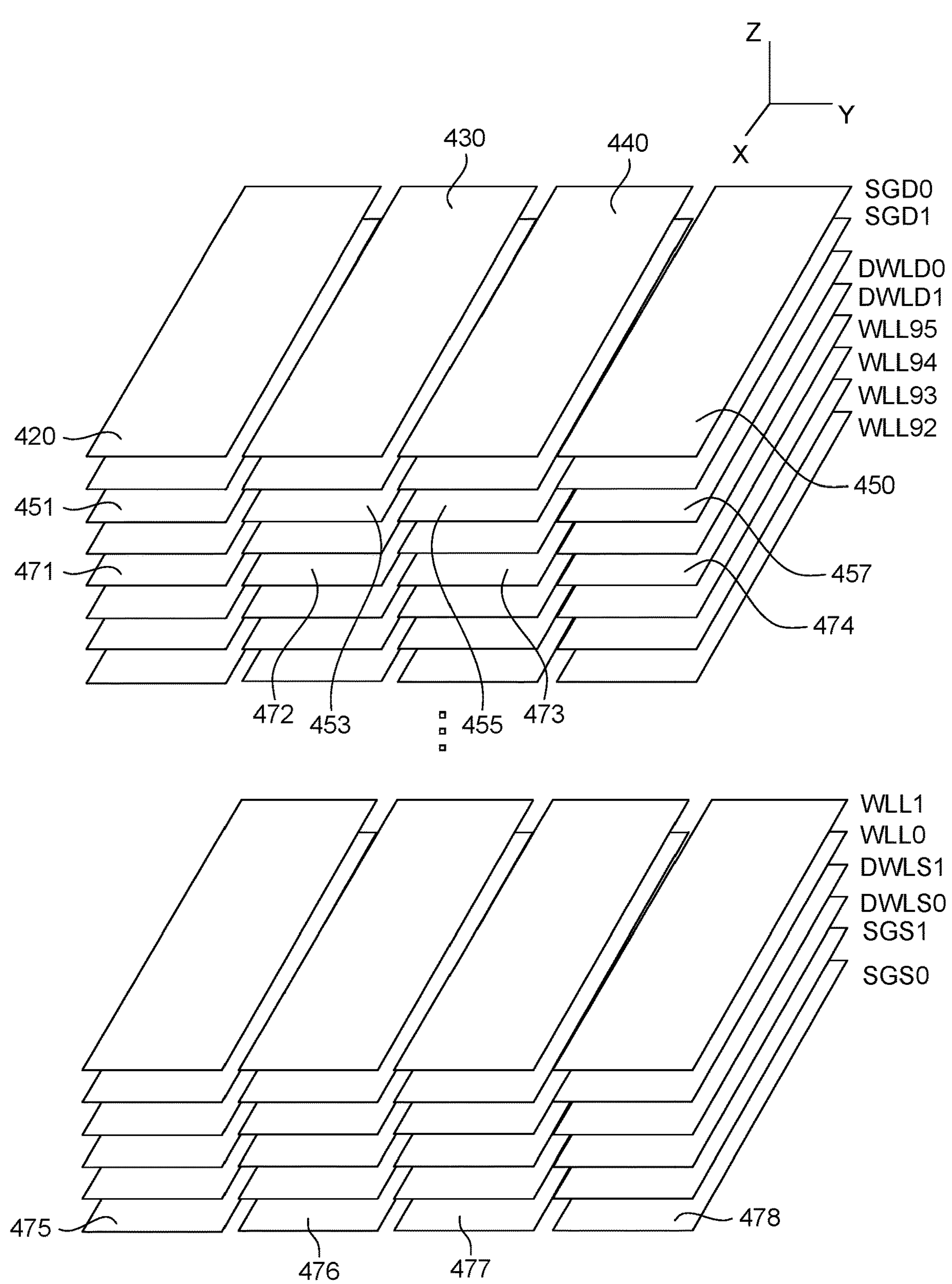
FIG. 4D depicts an alternative view of the select gate layers and wordline layers.

FIG. 4D depicts an alternative view of the SG layers and wordline layers of the stack 435 of FIG. 4C. The SGD layers SGD0 and SGD0 (the drain-side SG layers) each includes parallel rows of SG lines associated with the drain-side of a set of NAND strings. For example, SGD0 includes drain-side SG regions 420, 430, 440 and 450, consistent with FIG. 4B.

Below the SGD layers are the drain-side dummy wordline layers. Each dummy wordline layer represents a wordline, in one approach, and is connected to a set of dummy memory cells at a given height in the stack. For example, DWLD0 comprises wordline layer regions 451, 453, 455 and 457. A dummy memory cell, also referred to as a non-data memory cell, does not store data and is ineligible to store data, while a data memory cell is eligible to store data. Moreover, the Vth of a dummy memory cell is generally fixed at the time of manufacturer or may be periodically adjusted, while the Vth of the data memory cells changes more frequently, e.g., during erase and programming operations of the data memory cells.

Below the dummy wordline layers are the data wordline layers. For example, WLL95 comprises wordline layer regions 471, 472, 473 and 474. Below the data wordline layers are the source-side dummy wordline layers. Below the source-side dummy wordline layers are the SGS layers. The SGS layers SGS0 and SGS1 (the source-side SG layers) each includes parallel rows of SG lines associated with the source-side of a set of NAND strings. For example, SGS0 includes source-side SG lines 475, 476, 477 and 478. Each SG line can be independently controlled, in one approach. Or, the SG lines can be connected and commonly controlled.

Figure 4E:
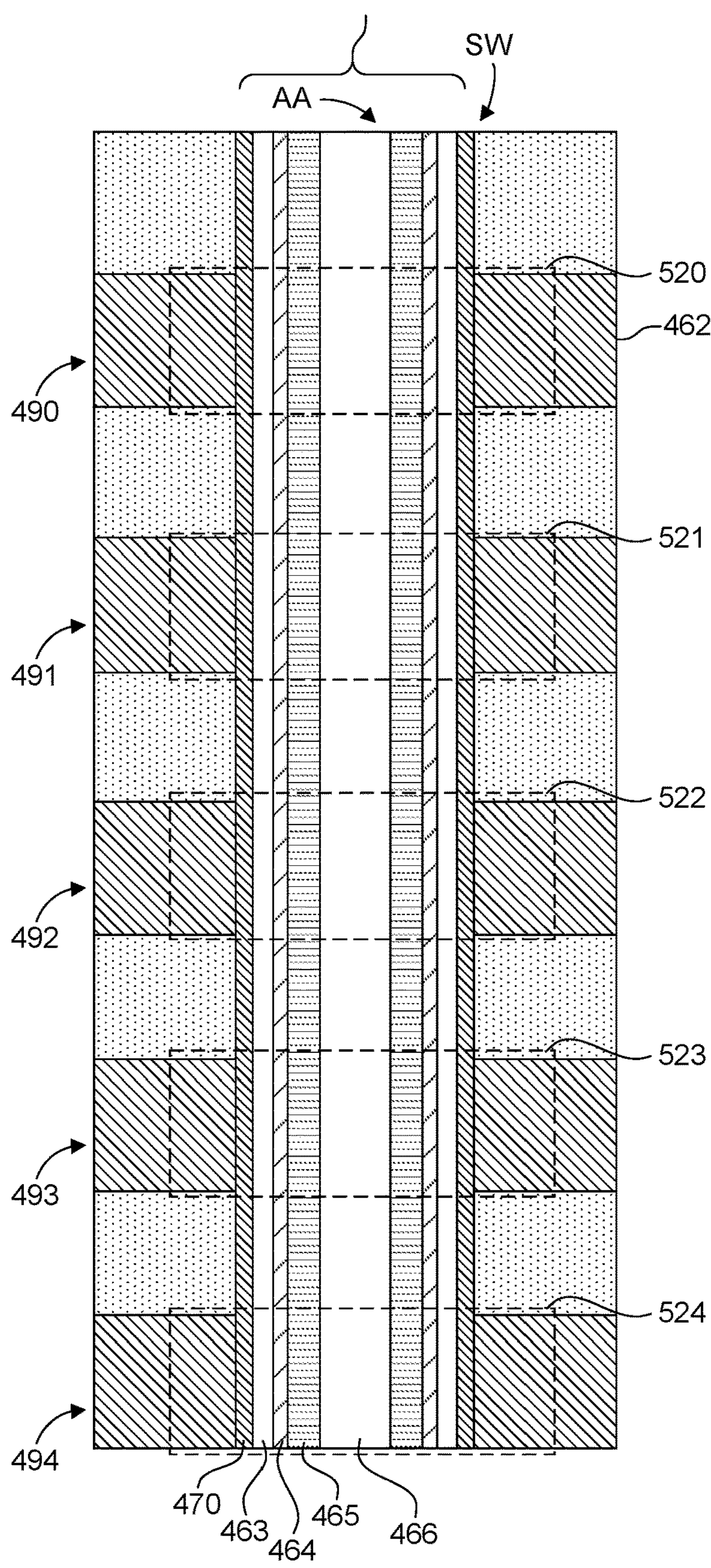
FIG. 4E depicts a view of the region 445 of FIG. 4C.

FIG. 4E depicts a view of the region 445 of FIG. 4C. Data memory cell transistors 520 and 521 are above dummy memory cell transistor 522. Below dummy memory cell transistor 522 are data memory cell transistors 523 and 524. A number of layers can be deposited along the sidewall (SW) of the memory hole 444 and/or within each wordline layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A wordline layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel. For example, in one embodiment, the erase operation includes removing electrons from the floating gate in order to change the state of the cell to 1. During the erase operation, a large negative voltage is required to repel electrons from the floating gate. This can be accomplished by grounding the control gate and applying a high voltage (e.g., about 18V or more) to the substate. As a result, electrons are removed from the floating gate due to the FN tunneling effect.

Non-data transistors (e.g., select transistors, dummy memory cell transistors) may also include the charge trapping layer 463. In FIG. 4E, dummy memory cell transistor 522 includes the charge trapping layer 463. Thus, the threshold voltage of at least some non-data transistors may also be adjusted by storing or removing electrons from the charge trapping layer 463. It is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4F:
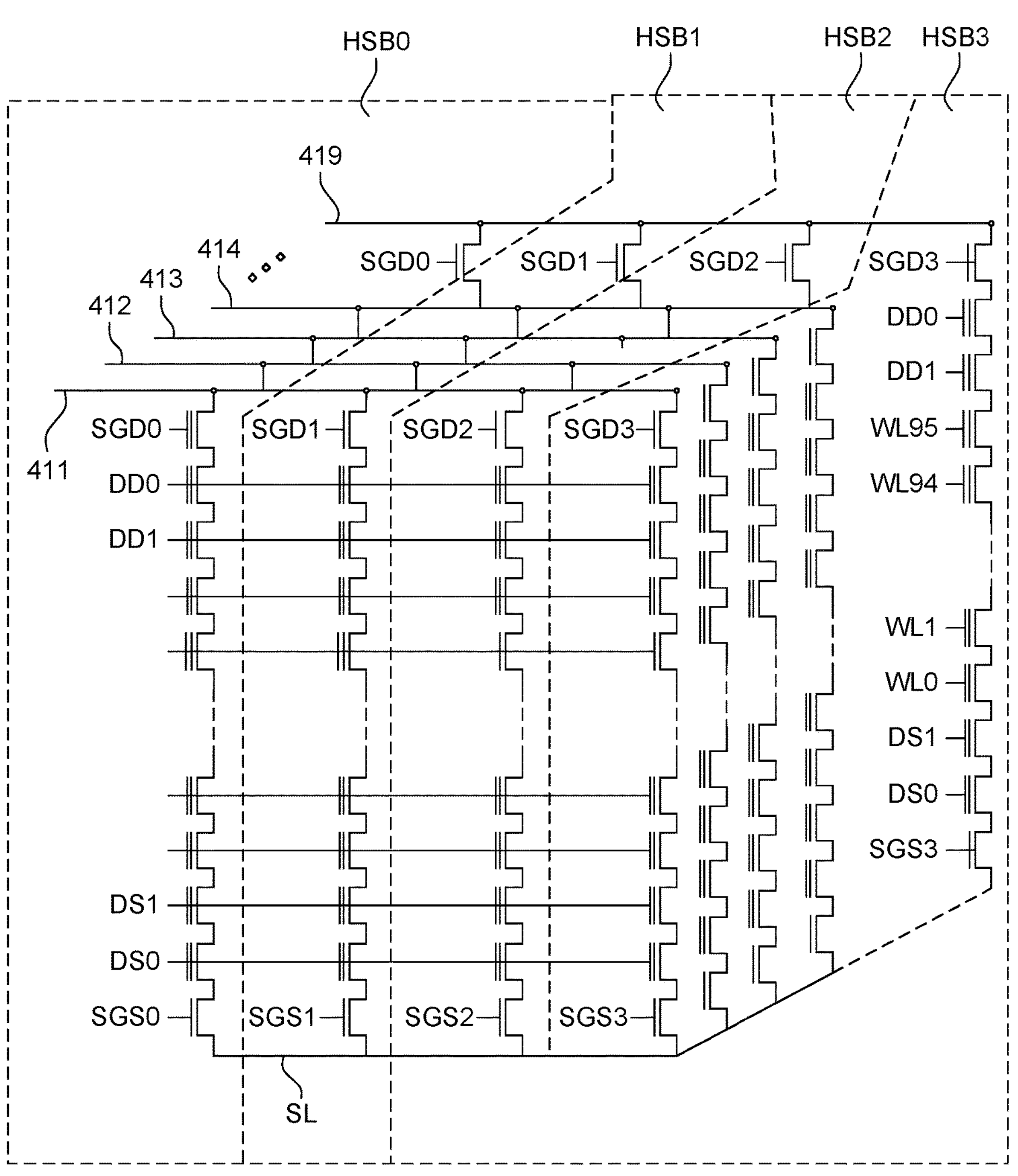
FIG. 4F is a schematic of a plurality of example NAND strings showing multiple horizontal sub-blocks, in connection with which, example embodiments of the disclosed technology can be implemented.

FIG. 4F is a schematic diagram of a portion of the memory depicted in FIGS. 3-4E. FIG. 4F shows physical wordlines WLL0-WLL95 running across the entire block. The structure of FIG. 4F corresponds to portion 306 in Block 2 of FIGS. 4A-E, including bitlines 411, 412, 413, 414, . . . 419. Within the block, each bitline is connected to four NAND strings. Drain side selection lines SGD0, SGD1, SGD2 and SGD3 are used to determine which of the four NAND strings connect to the associated bitline(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, Horizontal sub-block HSB1 corresponds to those vertical NAND strings controlled by SGD1 and SGS1, Horizontal sub-block HSB2 corresponds to those vertical NAND strings controlled by SGD2 and SGS2, and Horizontal sub-block HSB3 corresponds to those vertical NAND strings controlled by SGD3 and SGS3.

Figure 4G:
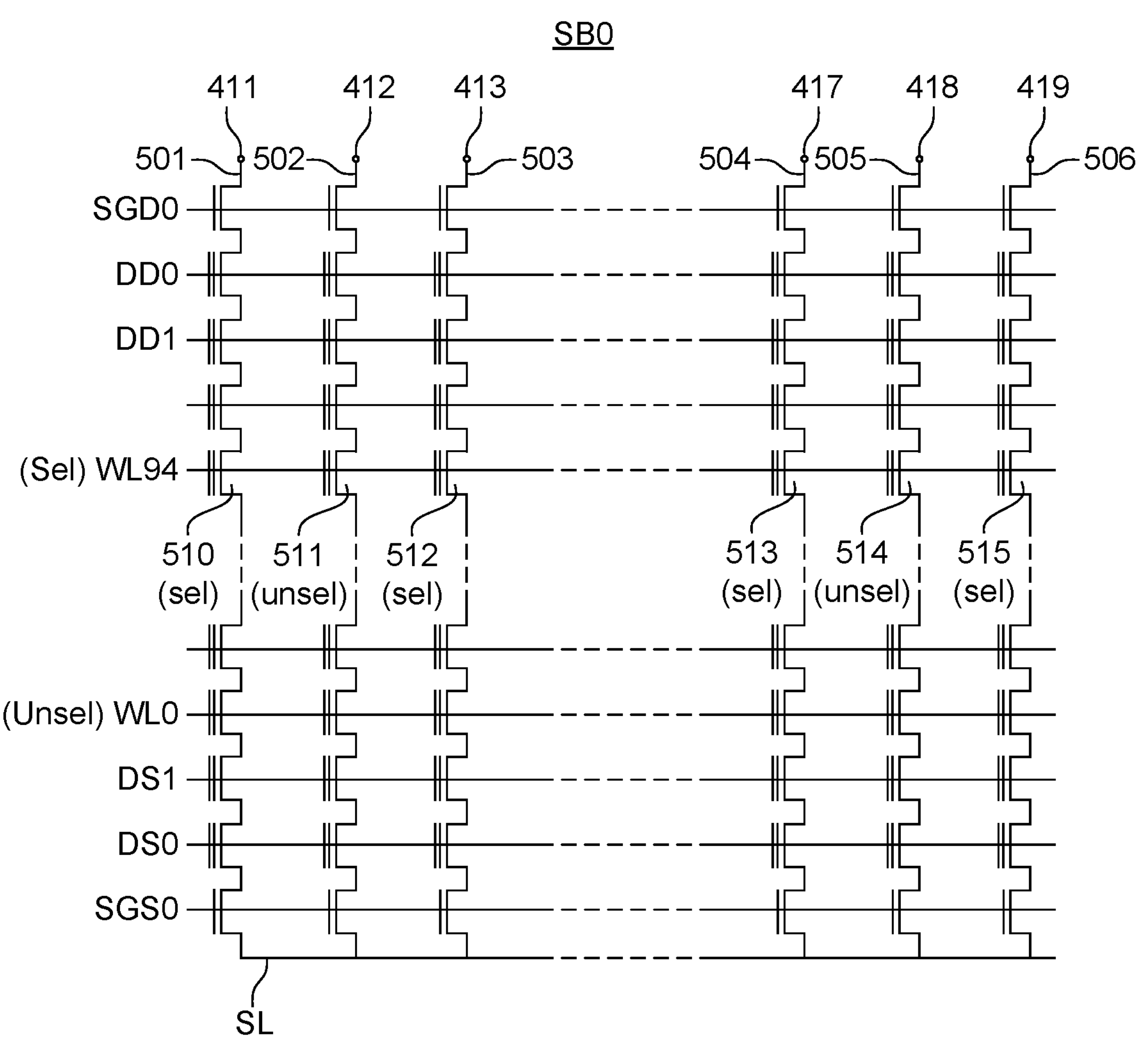
FIG. 4G is a schematic of horizontal sub-block HSB0.

FIG. 4G is a schematic of horizontal sub-block HSB0. Horizontal sub-blocks HSB1, HSB2 and HSB3 have similar structures. FIG. 4G shows physical wordlines WL0-WL95 running across the entire sub-block S0. All of the NAND strings of sub-block S0 are connected to SGD0 and SGS0. FIG. 4G only depicts six NAND strings 501, 502, 503, 504, 505 and 506; however, horizontal sub-block HSB0 will have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells while the memory cells that are not intended to take on a new electrical characteristic (or other characteristic) to reflect a changed programming state are referred to as the unselected memory cells. In certain situations, unselected memory cells may be connected to the same wordline as selected memory cells. Unselected memory cells may also be connected to different wordlines than selected memory cells. Similarly, during a reading process, the set of memory cells to be read are referred to as the selected memory cells while the memory cells that are not intended to be read are referred to as the unselected memory cells.

To better understand the concept of selected memory cells and unselected memory cells, assume a programming operation is to be performed and, for example purposes only, that wordline WL94 and horizontal sub-block HS0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HS0 are selected memory cells and some of the memory cells connected to WL94 in horizontal sub-block HS0 are unselected memory cells depending on how the programming operation is performed and the data pattern being programmed. For example, those memory cells that are to remain in the erased state S0 will be unselected memory cells, because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 511 and 514 (which are connected to wordline WL94) are to remain in the erased state; therefore, memory cells 511 and 514 are unselected memory cells (labeled unsel in FIG. 4G). Additionally, assume for example purposes that memory cells 510, 512, 513 and 515 (which are connected to wordline WL94) are to be programmed to any of the data states S1-S7; therefore, memory cells 510, 512, 513 and 515 are selected memory cells (labeled sel in FIG. 4G).

Although the example memory system of FIGS. 3-4G is a three dimensional memory structure that includes vertical NAND strings with charge-trapping material, other (2D and 3D) memory structures can also be used with the technology described herein.

As noted above, in example embodiments, Data Bit Inversion (DBI) encoding schemes are utilized. A DBI encoding scheme considers an incoming byte of eight bits of data and counts the total number of 0s and 1s among the eight bits in the byte. If the byte has five or more 1s then each bit in the byte is changed to its opposite state; that is, each 1 in the byte is inverted to a 0 and each 0 in the byte is inverted to a 1. For example, a byte of 11110001 has five 1s and thus a DBI encoder would invert the bits in the byte to 00001110, leaving the byte with only three 1s. If, on the other hand, the byte has four or fewer 1s then the bits in the byte are not inverted. For example, a byte of 11000001 has only three 1s and thus a DBI encoder would not invert the bits.

Accordingly, DBI encoding can ensure that the number of 1s in a byte is four or fewer. In DBI encoding if the byte to be encoded has five or more 1s—and therefore the DBI encoding has to invert the bits—then a DBI flag is set to 1, and if the byte to be encoded has four or fewer 1s—and therefore DBI encoding does not invert the bits—then a DBI flag is set to 0. Thus a DBI encoder sets a DBI flag bit to 1 or 0 during DBI encoding depending on whether the DBI encoding resulted in the bits being inverted or not.

Flash memories use a DBI scheme for reducing the interface power dissipation. The disclosed technology uses DBI encoding as an error detection scheme; DBI encoding moves random data bytes into the known DBI distribution. In eight bits of data there are $2^8$ or 256 possible combinations of 0s and 1s among the eight bits. Given 256 different eight-bit data bytes, and considering the possible combinations of 0s and 1s in the eight bits, 163 of the 256 bytes will have four or fewer 1s. Those 163 bytes make up the DBI set. 93 of the 256 bytes will have five or more 1s. Those 93 bytes make up the non-DBI set.

Figure 5:
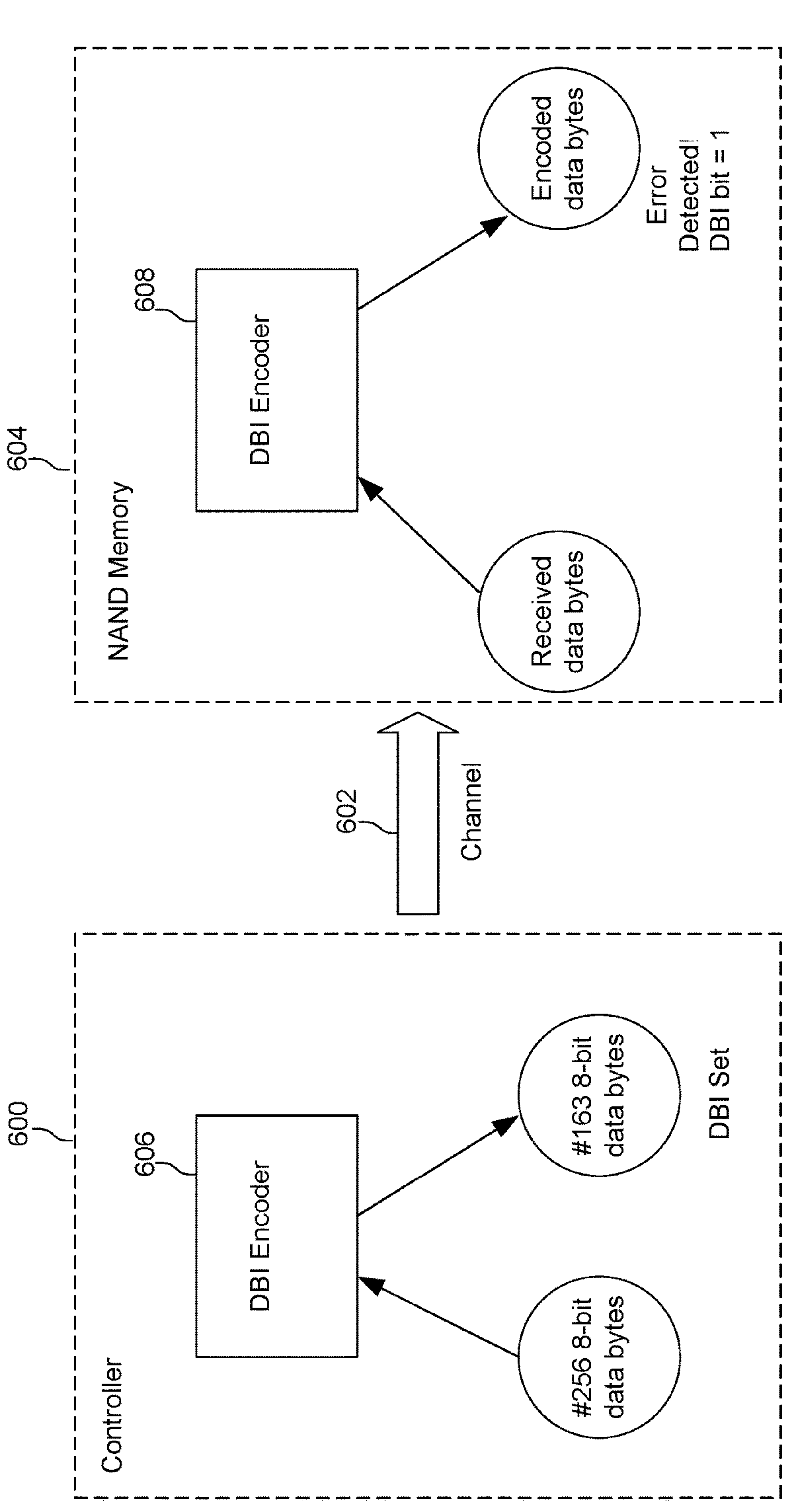
FIG. 5 shows the concept of the error detection scheme of the disclosed technology according to an example embodiment.

FIG. 5 shows the concept of the error detection scheme of the disclosed technology according to an example embodiment. In FIG. 5 data is being passed from a controller 600 over a channel 602 to a NAND memory 604. The controller 600 and the NAND memory 604 may be similar to the controller 122 and the memory die 108 respectively described in connection with FIGS. 1-4G. The controller 600 and the NAND memory 604 each have respective DBI encoders 606, 608 associated with them. The DBI encoders 606, 608 may be located on-chip or off-chip. The goal is to detect whether there is an error in the data received by the NAND memory 604 and thus whether there may be an error in the channel 602.

The controller 600 receives incoming data bytes and then the DBI encoder 606 performs a first DBI encoding on the received data bytes. This ensures that all of the bytes that have passed through the DBI encoder 606 have four or fewer 1s, and thus are part of the known DBI set, before they are passed through the channel 602. The once-encoded bytes are then passed through the channel 602, e.g., one byte at a time or continuously, where they are received by the NAND memory 604. After the NAND memory 604 receives the once-encoded bytes the DBI encoder 608 performs a second DBI encoding on the received bytes.

The DBI encoder 608 sets a flag to 1 or 0 during DBI encoding depending on whether the DBI encoding of a byte resulted in the bits of the byte being inverted or not. For example, if the byte received from the channel 602 contains five or more 1s and thus the DBI encoder 608 must invert the bits then the DBI flag gets set to 1. And if the byte received from the channel contains four or fewer 1s and thus the DBI encoder 608 does not invert the bits then the DBI flag gets set to 0.

It is expected, if there is no error over the channel 602, that each of the once-encoded bytes received over the channel 602 contains four or fewer 1s. In that case, the second DBI encoder 608 will not invert the bits, and therefore each DBI flag bit on each respective twice-encoded byte is zero. If however any of the once-encoded bytes received over the channel 602 contains five or more 1s, and therefore the DBI encoder 608 inverts the bits setting the DBI flag on the twice-encoded byte to 1, then it can be concluded that the byte contains an error.

When the DBI flag on the twice-encoded byte is 1 it can be concluded that an error has been detected over the channel 602 because all of the bytes in a known DBI set sent over the channel 602 should remain part of the DBI set (i.e., with four or fewer 1s) when received by the NAND memory 604. If however a byte is part of the non-DBI set (i.e., with five or more 1s) after being received from the channel and thus the second DBI encoding had to invert the byte, it can then be concluded that the byte was corrupted with an error from being passed through the channel 602.

Accordingly, the DBI flag on a twice-encoded byte set by the DBI encoder 608 can operate as an error flag, or can be used to set an error flag. The error flag can be communicated from the NAND memory 604 to the controller 602. The controller 602 can continually check the error flag and can act on the error flag to stop a write operation to the memory core if the error flag is 1 or high, or to continue the write operation to the memory core if the error flag is 0 or low.

Figure 6:
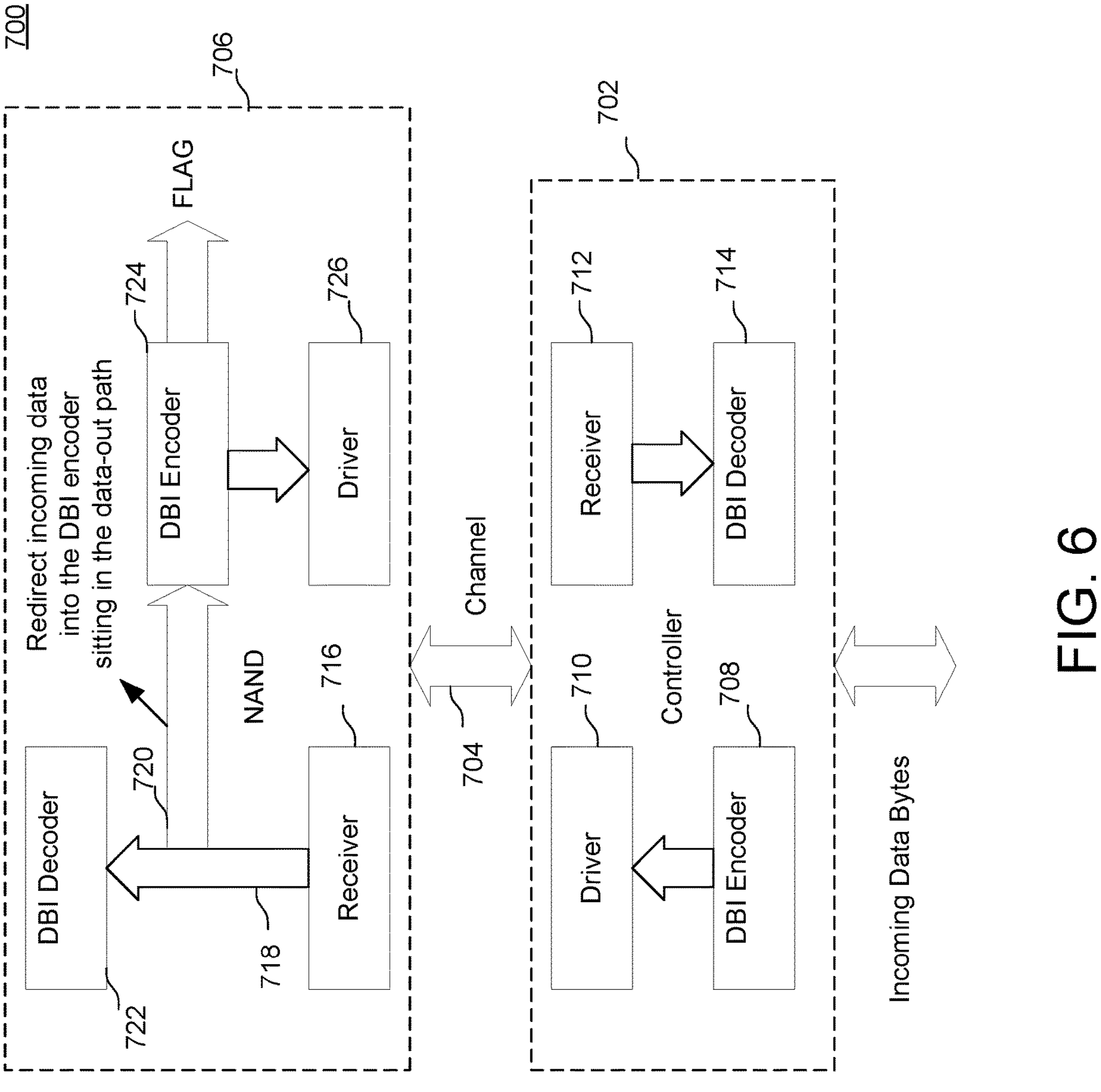
FIG. 6 is a schematic block diagram depicting an error detecting system according to an example embodiment.

FIG. 6 is a schematic block diagram depicting an error detecting system 700 according to an example embodiment. In FIG. 6 data is being passed from a controller 702 over a channel 704 to a NAND memory 706. The controller 702 and the NAND memory 706 may be similar to the controller 122 and the memory die 108 respectively described in connection with FIGS. 1-4G, or may be implemented in one or more hardware/software components off chip.

The controller 702 has a DBI encoder 708, a driver 710, a receiver 712, and a DBI decoder 714. The NAND memory 706 has a receiver 716, a DBI decoder 722, a DBI encoder 724, and a driver 726. The system 700 of FIG. 6 can detect whether there is an error in the data received by the NAND memory 706 and thus whether there may be an error in the channel 704.

In FIG. 6 the controller 702 receives incoming data bytes and then the DBI encoder 708 performs a first DBI encoding on the received data bytes. This ensures that all of the bytes that have passed through the DBI encoder 708 have four or fewer 1s and thus are part of the known DBI set, before they are passed through the channel 704. The once-encoded bytes are then passed through the channel 704, e.g., one byte at a time or continuously, where they are received by the receiver 716 of the NAND memory 706.

Under normal processing in a conventional NAND memory, the received data would pass from the receiver of the NAND memory to the DBI decoder 722 through data bus 718. However, the NAND memory 706 according to embodiments of the disclosed technology redirects the incoming data via data bus 720 into the DBI encoder 724 sitting in the data-out path, as part of the error detection scheme of the system 700 of FIG. 6. The DBI encoder 724 then performs a second DBI encoding on the bytes received in the NAND memory 706.

The DBI encoder 724 sets a flag to 1 or 0 during DBI encoding depending on whether the DBI encoding of a byte resulted in the bits of the byte being flipped or not. For example, if the byte received from the channel 704 contains five or more 1s and thus the DBI encoder 724 must invert the bits then the DBI flag bit gets set to 1. And if the byte received from the channel 704 contains four or fewer 1s and thus the DBI encoder 724 does not invert the bits then the DBI flag bit gets set to 0.

If there is no error over the channel 704 it would be expected that each of the once-encoded bytes received over the channel 704 contains four or fewer 1s. In that case, the DBI encoder 724 would not invert the bits, and therefore each DBI flag bit on each respective byte encoded by the DBI encoder 724 would be zero, as designated by the FLAG of FIG. 6. If however any of the once-encoded bytes received over the channel 704 contains five or more 1s, and therefore the DBI encoder 724 inverts the bits setting the DBI flag bit on the twice-encoded byte to one, it can then be concluded that the byte contains an error. It can then be determined that an error has been detected over the channel 704 because all of the bytes in a known DBI set that is sent over the channel 704 should remain part of the DBI set (i.e., with four or fewer 1s) when received by the NAND memory 706. If a byte was part of the non-DBI set (i.e., with five or more 1s) after being received from the channel 704 and thus the second DBI encoder 724 had to invert the byte, then it can be concluded that the byte was corrupted with an error from being passed through the channel 704.

As long as the NAND memory 706 does not determine that there is a data error over the channel (FLAG=0 on all twice-encoded bytes), the NAND memory 706 would continue to pass the single-encoded data byte to the DBI decoder 722 and thereafter to the memory core, such as to the memory core of non-volatile memory system 100. If however the NAND memory 706 determines that there is indeed a data error over the channel (FLAG=1 on any twice-encoded byte), the NAND memory 706 can communicate an error message to the controller 702 so that the controller 702 can stop the write operation of the bytes into the memory core. The NAND memory 706 can also report the error.

Accordingly, the DBI flag on a twice-encoded byte set by the DBI encoder 724 can operate as an error flag, or can be used to set an error flag. The error flag can be communicated from the NAND memory 706 to the controller 702. The controller 702 can continually check the error flag and can act on the error flag to stop a write operation to the memory core if the error flag is 1 or high, or to continue the write operation to the memory core if the error flag is 0 or low.

Figure 7:
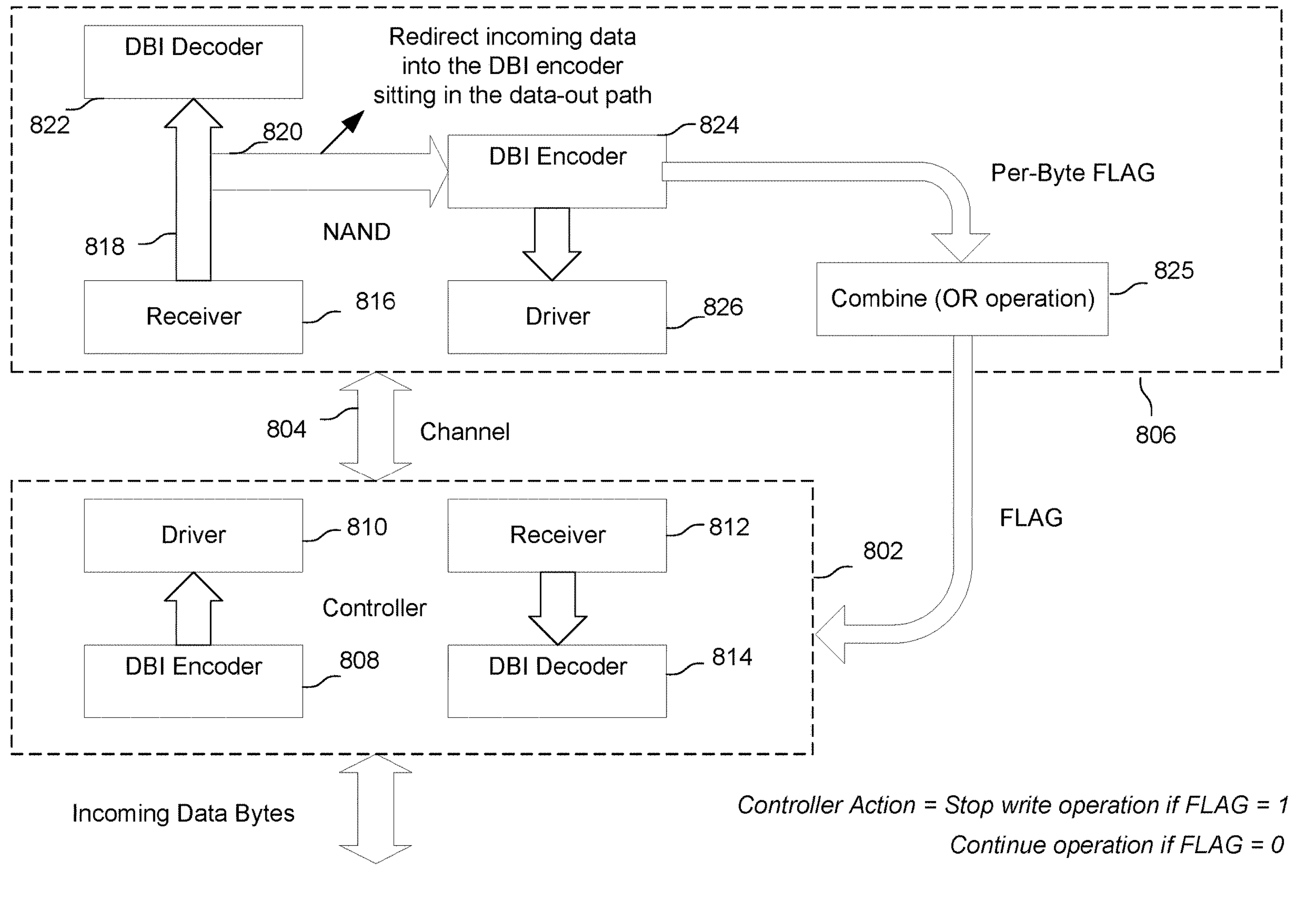
FIG. 7 is a schematic block diagram depicting an error detecting system according to another example embodiment.

FIG. 7 is a schematic block diagram depicting an error detecting system 800 according to another example embodiment. A difference between the example embodiment of FIG. 6 and that of FIG. 7 is that the NAND memory 806 of FIG. 7 also contains logic which performs an OR operation, such as one or more OR logic gates 825. (It is noted that the element "OR logic gate 825" as used throughout this application refers to logic which performs an OR operation, such as one or more OR logic gates.)

In FIG. 7 data is being passed from a controller 802 over a channel 804 to a NAND memory 806. The controller 802 and the NAND memory 806 may be similar to the controller 122 and the memory die 108 respectively described in connection with FIGS. 1-4G, or may be implemented in one or more hardware/software components off chip. The controller 802 has a DBI encoder 808, a driver 810, a receiver 812, and a DBI decoder 814. The NAND memory 806 has a receiver 816, a DBI decoder 822, a DBI encoder 824, an OR logic gate 825, and a driver 826. The system 800 of FIG. 7 can detect whether there is an error in the data received by the NAND memory 806 and thus whether there may be an error in the channel 804.

The controller 802 receives incoming data bytes and then the DBI encoder 808 performs a first DBI encoding on the received data bytes. This ensures that all of the bytes that have passed through the DBI encoder 808 have four or fewer 1s and thus are part of the known DBI set, before they are passed through the channel 804. The once-encoded bytes are then passed over the channel 804, e.g., one byte at a time or continuously, where they are received by the receiver 816 of the NAND memory 806.

Under normal processing in a conventional NAND memory, the received data would pass from the receiver of the NAND memory to the DBI decoder 822 through data bus 818. However, the NAND memory 806 according to embodiments of the disclosed technology redirects the incoming data via data bus 820 into the DBI encoder 824 sitting in the data-out path, as part of the error detection scheme of the system 800 of FIG. 7. The DBI encoder 824 then performs a second DBI encoding on the bytes received in the NAND memory 806.

The DBI encoder 824 sets a flag to 1 or 0 during DBI encoding depending on whether the DBI encoding of a byte resulted in the bits of the byte being inverted or not. For example, if the byte received from the channel 804 contains five or more 1s and thus the DBI encoder 824 must invert the bits then the DBI flag gets set to 1. And if the byte received from the channel 804 contains four or fewer 1s and thus the DBI encoder 824 does not invert the bits then the DBI flag gets set to 0.

As noted above, the NAND memory 806 further comprises an OR logic gate 825. The OR gate 825 is configured to: (1) combine N bytes of data that have been output from the DBI encoder 824, (2) check the DBI flags on each outputted N byte, and (3) determine that the channel 804 contains an error when the DBI flag on any of the N bytes is 1 (per-byte FLAG). The controller 802 can be further configured to stop a write operation of the N bytes when the DBI flag on any of the N bytes is 1. This can be done by a control signal or flag signal sent from the NAND memory 806 to the controller 802 based on the output of the OR logic gate 825. For example, the flag signal can be 0 (indicating no error) or 1 (indicating an error, i.e., that the flag on any of the N bytes is 1). The controller 802 can continually check the flag signal and stop the write operation when the flag signal is 1 or high, or continue the write operation when the flag signal is 0 or low.

As long as the NAND memory 806 does not determine that there is a data error over the channel, the NAND memory 806 would continue to pass the single-encoded data byte to the DBI decoder 822 and thereafter to the memory core, such as to the memory core of non-volatile memory system 100.

By combining the bytes outputted from the DBI encoder 824 into N bytes of data using the OR gate 825, the effectiveness of the error-detecting scheme, i.e., the probability of detecting an error when there is an error, can be improved. Just one byte outputted from the DBI encoder 824 could still have an error even if the DBI flag on the byte is 0. This could happen if for example a byte that was part of the DBI set became corrupted in the channel 804 but nevertheless remained part of the DBI set. Take as an example byte 00011111. This byte has five 0s and so would be inverted by the first DBI encoder 808 to 11100000 to become part of the DBI set. Let's say that the byte 11100000 then became corrupted over the channel 804 such that when received by the receiver 816 of the NAND memory 806 the byte had become 11110000. This byte would then be again DBI encoded by the DBI encoder 824 and would remain 11110000, with no bits being flipped. However, because the byte would still have four or fewer 0s and thus would still be part of the DBI set, the FLAG would be set to 0 even though the byte would still contain an error.

This problem can be reduced or minimized, and the error detecting scheme optimized, by including the OR gate 825 in the system 800. By including the OR gate 825, the probability of detecting an error if there is an error can increase. As shown above, just one byte outputted from the DBI encoder 824 could still have an error even if the DBI flag on the byte is 0, if for example a byte that was part of the DBI set became corrupted in the channel 804 but nevertheless remained part of the DBI set. However it is less likely that all N bytes of data output from the DBI encoder 824 would have DBI flags of 0 even if there was an error over the channel 804. Thus by checking the flags on N bytes of data at once, N being an integer greater than one, the probability of detecting an error over the channel if there is an error increases relative to checking just one byte. Further, the greater the value of N is (e.g., N=30 or N=50 or N=500 or N=1,000), the greater the probability that an error will be detected if there is an error. Stated another way, the probability of error in the error-detecting scheme decreases as N increases. In one non-limiting example, N=30 provides a low probability of error.

The following relation applies, where $P_e$ is the probability of error in the error-detecting scheme of the disclosed technology:

$$P_e = P(\text{received data in } DBI \text{ set with bits flip} \mid \text{sent data from } DBI \text{ set})$$

$$= \frac{N\ (\text{in } DBI \text{ set})}{N\ (\text{in } DBI \text{ set}) + N\left(\text{in non}-DBI \text{ set}\right)}$$

$$= \frac{163}{256} = \sim 0.636$$

$$Pe \text{ for data block} = Pe^{\text{No. of data bytes in data block}}$$

Accordingly, 63.6% is the probability of error in the error-detecting scheme of the disclosed technology, if just one DBI flag is considered. This is the probability that the error-detecting scheme would give a "false correct" value (i.e., DBI flag of 0) when considering just one byte of data, and not be able to detect the error in the single byte of data. This is because, as noted above, in a set of 256 eight-bit bytes each having a different combination of bits, 163 of the 256 bytes will naturally be in the DBI set (i.e., four or fewer 1s). Accordingly to reduce the probability of error in the error-detecting scheme from considering the DBI flag from only one byte, the DBI flags of N bytes are combined and considered, and the greater the N the lower the probability of error in the error-detecting scheme. This allows an error detecting system to be designed using the OR logic gate, with the number of flag bits to be combined being decided depending upon the required probability of error in the error-detecting scheme.

Figure 8:
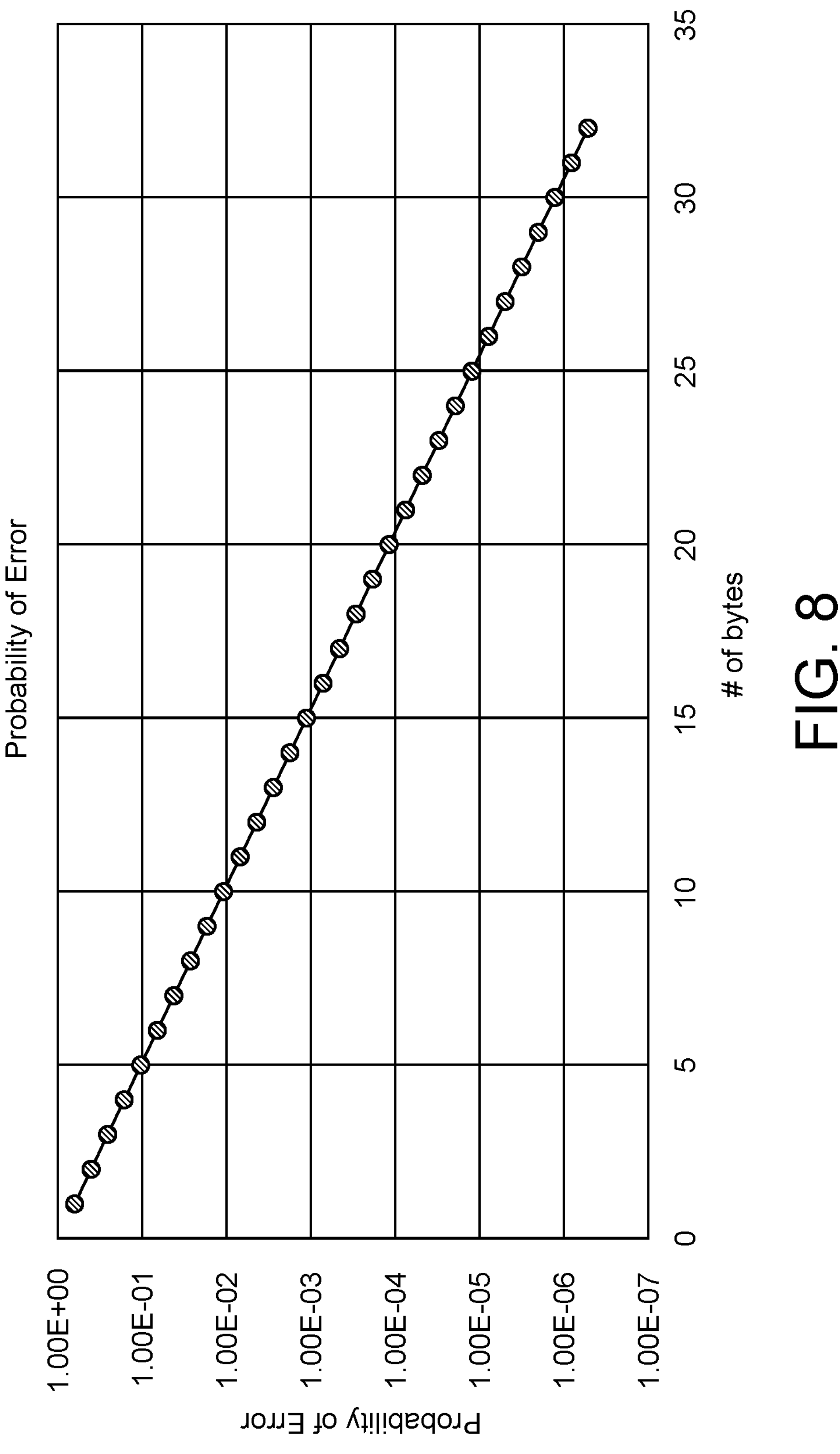
FIG. 8 is a graph showing a plot of the probability of error in the error-detecting scheme vs. the number of data bytes according to example embodiments.

The graph in FIG. 8 shows a plot of the probability of error in the error-detecting scheme vs. the number of data bytes. As can be seen from the graph, the probability of error in the error-detecting scheme decreases as the number of N bytes considered increases.

Figure 9:
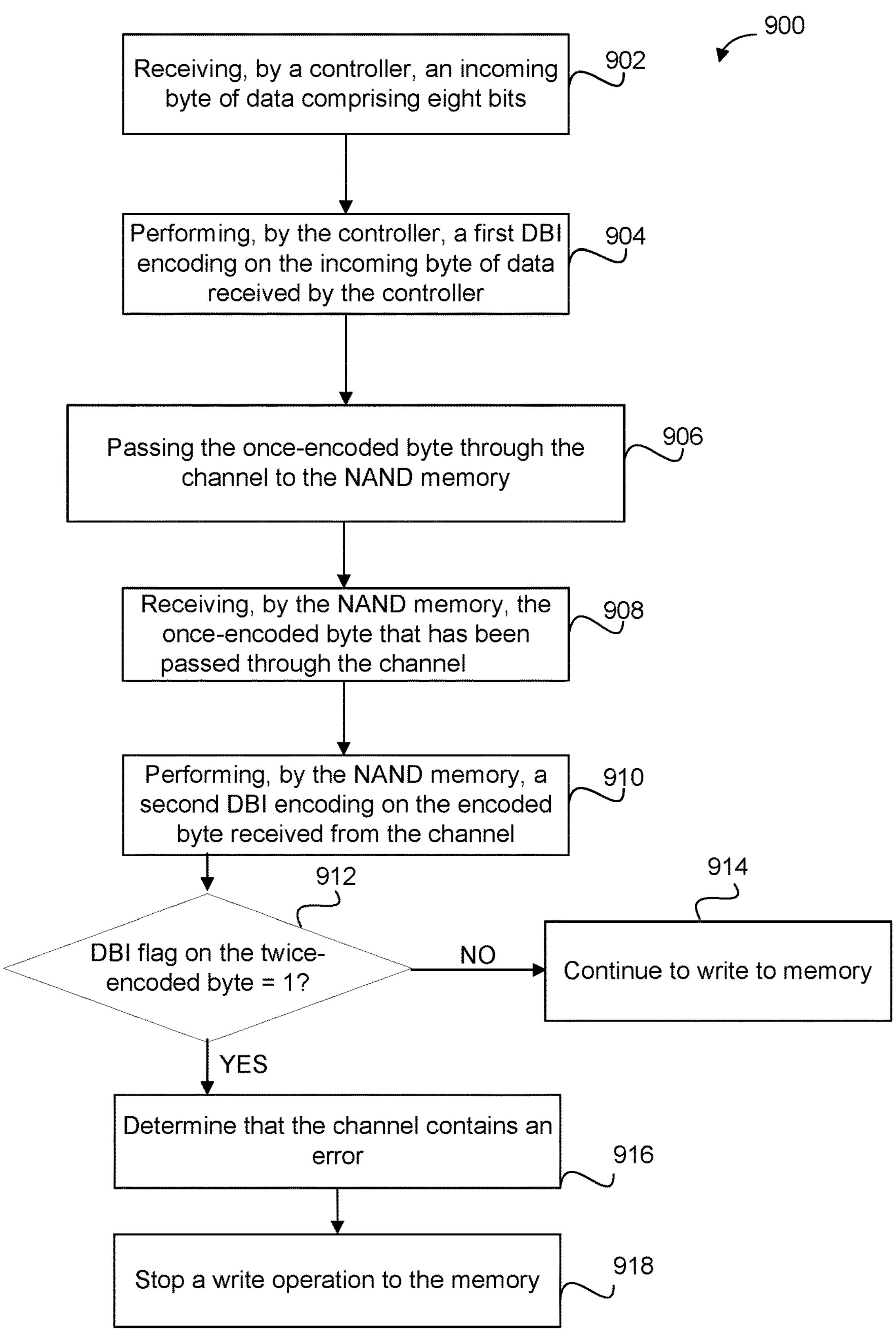
FIG. 9 shows a method of detecting errors in data, according to an example embodiment.

FIG. 9 is a method 900 of detecting errors in data, according to an example embodiment. The method 900 may be performed for example by the controller 122 and the NAND memory 108. The method 900 may also be implemented for example by a non-volatile memory or a circuit or a computing component in accordance with examples of the application. The computing component may include one or more hardware processors and a machine-readable storage medium. The one or more hardware processors may fetch, decode, and execute instructions, such as instructions 902-920, to control processes or operations during run-time. The machine-readable storage medium may be encoded with executable instructions, for example instructions 902-920, which, when executed by the one or more processors, performs the method 900 of detecting errors in data.

Step 902 includes receiving, for example by a controller, an incoming byte of data comprising eight bits. The incoming byte of data may be random data. Step 904 includes performing, for example by the controller, a first DBI encoding on the incoming byte of data received by the controller. Thus, if the byte has five or more 1s then each bit in the byte is inverted from a 0 to 1 or a 1 to 0 respectively. After that, it is known that all of the bytes to be passed through a channel have four or fewer 1s meaning that all of the bytes are in the known DBI set.

Step 906 includes passing the once-encoded byte through the channel to the NAND memory. (It is noted that if the once-encoded byte received by the NAND memory is later, in Step 916, found to be part of the non-DBI set then it can be concluded that there is an error in the byte and thus that the channel is corrupted.)

Step 908 includes receiving, by the NAND memory, the once-encoded byte that has been passed through the channel. Step 910 includes performing, by the NAND memory, a second DBI encoding on the encoded byte received from the channel. If the channel does not contain an error it would be expected that a DBI flag on the twice-encoded byte is 0, i.e., is part of the DBI set.

Step 912 includes checking whether a DBI flag on the twice-encoded byte is 1. If the outcome of Step 912 is NO, then in step 914 the controller may continue to write to the NAND memory or the memory core. If the outcome of Step 912 is YES then in Step 916 it is determined that the channel contains an error. Step 918 includes stopping a write operation to the NAND memory or the memory core.

Figure 10:
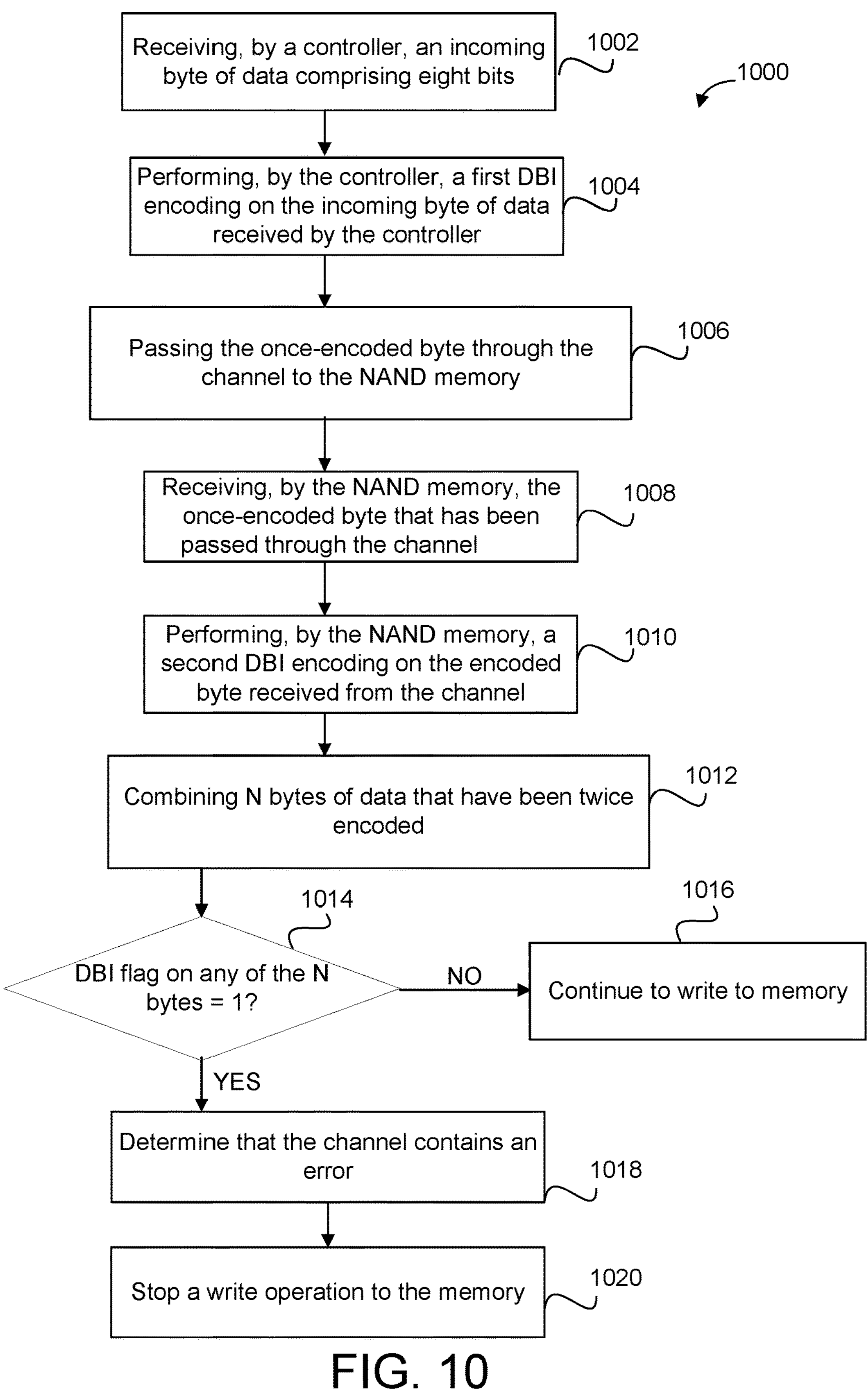
FIG. 10 shows a method of detecting errors in data, according to another example embodiment.

FIG. 10 is a method 1000 of detecting errors in data, according to an example embodiment. The method 1000 may be performed for example by the controller 122 and the NAND memory 108. The method 1000 may also be implemented for example by a non0volatile memory or a circuit or a computing component in accordance with examples of the application. The computing component may include one or more hardware processors and a machine-readable storage medium. The one or more hardware processors may fetch, decode, and execute instructions, such as instructions 1002-1020, to control processes or operations during run-time. The machine-readable storage medium may be encoded with executable instructions, for example instructions 1002-1020, which, when executed by the one or more processors, performs the method 1000 of detecting errors in data.

Step 1002 includes receiving, for example by a controller, an incoming byte of data comprising eight bits. The incoming byte of data may be random data. Step 1004 includes performing, for example by the controller, a first DBI encoding on the incoming byte of data received by the controller. Thus, if the byte has five or more 1s then each bit in the byte is inverted from a 0 to 1 or a 1 to 0 respectively. After that, it is known that all of the bytes to be passed through a channel have four or fewer 1s meaning that all of the bytes are in the known DBI set.

Step 1006 includes passing the once-encoded byte through the channel to the NAND memory. (It is noted that if the once-encoded byte received by the NAND memory is later, in Step 918, found to be part of the non-DBI set then it can be concluded that there is an error in the byte and thus that the channel is corrupted.)

Step 1008 includes receiving, by the NAND memory, the once-encoded byte that has been passed through the channel. Step 1010 includes performing, by the NAND memory, a second DBI encoding on the encoded byte received from the channel. If the channel does not contain an error it would be expected that a DBI flag on the twice-encoded byte is 0, i.e., is part of the DBI set.

Step 1012 includes combining N bytes of data that have been twice encoded. This step can be performed using logic which performs an OR operation, such as one or more OR logic gates. Step 1014 includes checking whether a DBI flag on any of the N bytes of twice-encoded data is 1. If the outcome of Step 1014 is NO, then in step 1016 the controller may continue to write to the memory core. If the outcome of Step 1014 is YES then in Step 1018 it is determined that the channel contains an error. Step 1020 includes stopping a write operation to the memory core.

Figure 11:
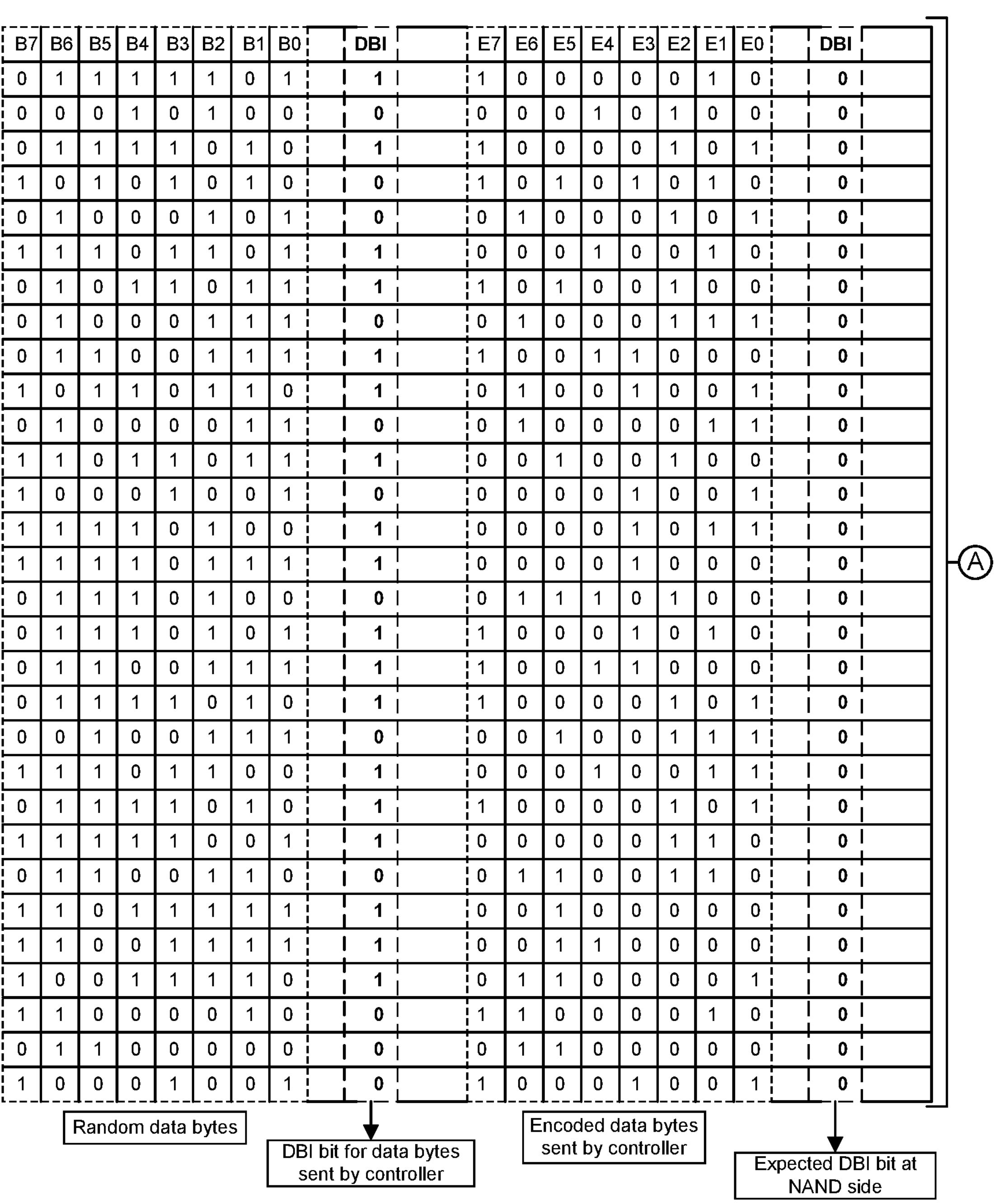
FIG. 11 is an example of random eight-bit bytes of data received by a controller, for the purpose of verifying the effectiveness of the disclosed technology after considering normal distribution noise over the channel.

FIG. 11 is an example for the purpose of verifying the effectiveness of the disclosed technology after considering normal distribution noise over the channel. It is of course to be understood that the disclosed technology is not limited to the example shown.

B7-B0 of FIG. 11 shows an example of random eight-bit bytes of data received by a controller. The column just to the right of B0 shows the respective DBI flags for each byte. As explained above the DBI flags are set to 1 or 0 based on whether the byte has five or more 1s, or four or fewer 1s, respectively. For example, the first byte in B7-B0 is 01111101 which has six 1s and so its DBI flag is set to 1. The second byte in B7-B0 is 00010100 which has two 1s and so its DBI flag is set to 0.

E7-E0 shows the respective data bytes of B7-B0 after DBI encoding is performed by the controller. As expected, all of the DBI flags in the encoded bytes of E7-E0 are set to 0. This is because all of the bytes that are DBI encoded fall into the known DBI set.

Next the encoded data is sent over the channel as shown in N7-N0. If the channel does not contain a defect then the expected DBI bit at the NAND side would be 0. R7-R0 shows the data received at the NAND side. DBI encoding is again performed, and the DBI flags set for each twice-encoded byte. As can be seen from R7-R0, the respective DBI flag bits after the second encoding show that a number of the received bytes contain errors, as indicated by those received bytes having a DBI flag of 1. This indicates a defect over the channel. Thus the effectiveness of the disclosed technology can be verified. It is noted again that the number of DBI bits in R7-R0 can be combined, such as using an OR gate, to generate and consider N DBI flags at once, thereby improving the probability of detection.

Technical solutions are realized throughout the disclosure. By virtue of the features of the disclosed technology, the existing data path architecture on the controller and the NAND memory can be re-utilized to provide an error-detection scheme that does not require the addition of an extra encoder circuit or large area overhead for implementation. No changes are needed in the controller. Rather, a single bit flag (DBI flag) is generated for every data byte received, which can serve as an error-detecting flag to be sent to the controller. In some embodiments no area overhead is needed; in other embodiments logic which performs an OR operation, such as one or more OR logic gates, are added to the NAND memory, or are added off-chip but associated with the NAND memory, which is an extremely modest addition of area.

Further, the disclosed technology does not lead to bandwidth loss. The disclosed technology does not add ECC bits to a byte or send ECC bits with every byte of data; instead, the disclosed technology leverages the existing DBI encoding characteristics to detect an error over a channel. Thus the disclosed technology uses deterministic characteristics of encoded data bytes for detecting error. Indeed the DBI encoder in the DOUT path is re-used. Incoming data bytes into the NAND memory are redirected and encoded through the DBI encoder on or associated with the NAND memory. As long as the NAND memory does not detect a data error over the channel, the NAND memory can continue to pass the single-encoded data byte to the DBI decoder of the NAND memory and thereafter to the memory core.

The disclosed technology is more suitable for NAND memory than is a Cyclic Redundancy Check (CRC). The disclosed technology also can be implemented such that normal functionality of a NAND memory is not affected. It is noted that the disclosed technology is not limited to a flash memory or NAND memory, but applies to other types of memory devices such as DRAM or others. By virtue of the features of the disclosed technology, a lossless or near lossless error-detecting scheme can be implemented and full or near full bandwidth can be utilized. This enables products utilizing NAND memory to be designed with good reliability and high throughput.

Accordingly, it is of course to be understood that while some of the example embodiments herein (including the embodiments of FIGS. 5-11) are described in the context of a NAND memory, implementations of the disclosed technology are not limited to a NAND memory and the disclosed technology can be implemented in other types of memories as well. Moreover, while in some of the example embodiments described herein (including the embodiments of FIGS. 5-11) a controller performs certain functions, in other embodiments at least some of those functions may be performed for example by a non-volatile memory.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not necessarily limited to any particular sequence, and the blocks or states relating thereto can be performed in other sequences that are appropriate, or may be performed in parallel, or in some other manner. Blocks or states may be added to or removed from the disclosed example embodiments.

As used herein, a circuit (or component, module, element, etc.) might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

Further, aspects of the present disclosure are described herein with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It is intended that the foregoing be understood as an illustration of selected forms that the invention can take and not as a definition of the invention. Finally, it should be noted that any aspect of any of the preferred embodiments described herein can be used alone or in combination with one another.

What is claimed is:

1. A method of detecting an error in data transmitted over a channel to a non-volatile memory die, comprising:

receiving over the channel, a plurality of bytes of DBI encoded data that are encoded by a first DBI encoding according to a DBI encoding scheme that selectively inverts bytes to reduce occurrence of a logic value;

performing, by a DBI circuit of the non-volatile memory die, a second DBI encoding according to the DBI encoding scheme on a byte of the DBI encoded data received over the channel to generate a byte of twice-encoded data, the second DBI encoding selectively inverts bytes to reduce occurrence of the logic value and sets a DBI flag for each byte that is inverted by the second DBI encoding;

checking a DBI flag for the byte of twice-encoded data after the second DBI encoding; and determining that the byte of DBI encoded data contains an error in response to detecting the DBI flag is set to indicate inversion of the byte of twice-encoded data by the second DBI encoding.

2. The method of claim 1, further comprising:

for the byte of data, setting an error flag to indicate an error when the DBI flag after the second DBI encoding is set to indicate inversion, and setting the error flag to indicate no error in response to detecting the DBI flag after the second DBI encoding is set to indicate no inversion.

3. The method of claim 2, further comprising stopping a write operation of the byte when the error flag indicates an error, or continuing a write operation of the byte when the error flag indicates no error.

4. The method of claim 1, further comprising:

combining N bytes of data that have been twice encoded, checking the DBI flag on each of the N bytes; and determining that the channel contains an error in response to detecting the DBI flag on any of the N bytes is set to indicate inversion.

5. The method of claim 4, wherein the combining is performed by an OR gate of the non-volatile memory.

6. The method of claim 4, further comprising stopping a write operation of the N bytes in response to detecting the DBI flag on any of the N bytes is set to indicate inversion.

7. The method of claim 4, further comprising continuing a write operation of the N bytes in response to detecting all of the DBI flags on the N bytes are not set, to indicate no inversion.

8. The method of claim 1, further comprising reporting that the channel contains an error in response to detecting the DBI flag after the second DBI encoding is set to indicate inversion.

9. The method of claim 4, further comprising reporting that the channel contains an error in response to detecting the DBI flag on any of the N bytes is set to indicate inversion.

10. The method of claim 1, wherein the non-volatile memory is a NAND memory.

11. A system for detecting an error in a byte of data transmitted over a channel, comprising:

a controller configured to:

perform a first DBI encoding on the byte of data, the first DBI encoding inverts the byte of data to generate a DBI encoded byte in response to determining that the byte of data includes five or more bits of a first value such that the DBI encoded byte has three or fewer bits of the first value, and after the first DBI encoding, transmit, over the channel, the DBI encoded byte of data; and a non-volatile memory die configured to:

receive the DBI encoded byte of data over the channel;

in response to determining that the DBI encoded byte of data includes five or more bits of the first value, perform a second DBI encoding on the DBI encoded byte of data received over the channel, the second DBI encoding inverts the DBI encoded byte of data to generate a byte of twice-encoded data and set a DBI flag to indicate inversion by the second DBI encoding, and determine that the DBI encoded byte of data received over the channel contains an error in response to detecting that the DBI flag for the twice-encoded byte of data is set to indicate inversion by the second DBI encoding.

12. The system of claim 11, wherein the non-volatile memory is further configured to stop a write operation of the byte in response to detecting the DBI flag after the second DBI encoding is set to indicate inversion.

13. The system of claim 11, wherein the non-volatile memory comprises an OR gate configured to:

combine N bytes of data that have been twice encoded, check the DBI flags on each of the N bytes, determine that the channel contains an error in response to detecting the DBI flag on any of the N bytes is set to indicate inversion.

14. The system of claim 13, wherein the non-volatile memory is further configured to stop a write operation of the N bytes in response to detecting the DBI flag on any of the N bytes is set to indicate inversion.

15. The system of claim 13, wherein the non-volatile memory is further configured to continue a write operation of the N bytes in response to detecting all of the DBI flags on the N bytes are set to indicate no inversion.

16. The system of claim 11, wherein the non-volatile memory is a NAND memory.

17. A method of detecting an error in data transmitted over a channel to a nonvolatile memory, comprising:

receiving over the channel, a plurality of bytes of DBI encoded data that are encoded by a first DBI encoding that selectively inverts only bytes that include five or more bits of a first logic value to reduce occurrence of the logic value;

performing, by a DBI circuit of the non-volatile memory, a second DBI encoding on the plurality of bytes of DBI encoded data received over the channel to generate a plurality of bytes of twice-encoded data, the second DBI encoding selectively inverts only bytes that include five or more bits of the first logic value to reduce occurrence of the first logic value and sets DBI flags to indicate inversion for any bytes that are inverted by the second DBI encoding;

combining N bytes of the plurality of bytes of twice-encoded data;

checking a DBI flag on each of the N bytes; and determining that the channel contains an error in response to detecting the DBI flag on any of the N bytes is set to indicate inversion.

18. The method of claim 17, further comprising sending a control signal to stop a write operation of the N bytes in response to detecting the DBI flag on any of the N bytes is set to indicate inversion.

19. The method of claim 17, further comprising continuing a write operation of the N bytes in response to detecting all of the DBI flags on the N bytes are set to indicate no inversion.

20. The method of claim 17, wherein the non-volatile memory is a NAND memory.

* * * * *